United States Patent [19]
Ohki

[11] Patent Number: 5,917,478
[45] Date of Patent: Jun. 29, 1999

[54] MEMORY ALLOCATION METHOD AND APPARATUS FOR COMPRESSION AND DECODING PICTURE DATA

[75] Inventor: Mitsuharu Ohki, Tokyo, Japan

[73] Assignee: Sony Corporation, Japan

[21] Appl. No.: 08/840,857

[22] Filed: Apr. 17, 1997

[30] Foreign Application Priority Data

May 20, 1996 [JP] Japan .................................. 8-125154

[51] Int. Cl.$^6$ ........................................ G09G 5/04
[52] U.S. Cl. ........................ 345/186; 345/511; 348/714; 348/717
[58] Field of Search .................. 345/186, 501, 345/199, 511; 348/714, 716, 717, 718, 415, 402, 511; 711/100

[56] References Cited

U.S. PATENT DOCUMENTS 5,559,952  9/1996  Fujimoto ................................ 345/511
5,668,599  9/1997  Cheney et al. ......................... 348/402
5,754,238  5/1998  Koyanagi et al. ...................... 348/415

*Primary Examiner*—Kee M. Tung
*Assistant Examiner*—Sy D. Luu
*Attorney, Agent, or Firm*—Rader, Fishman & Grauer; Ronald P. Kananen

[57] ABSTRACT

An information processing method used for compressing or decoding picture data wherein, in securing an area in which to store restored picture data, pre-set processing can be performed speedily without producing caching errors. Storage sites on a data memory are allocated to luminance signals and to associated chroma signals so that the luminance signals and the associated chroma signals will be copied in different locations in a data cache. The luminance signals and the associated chroma signals so allocated are stored in the data memory. For decoding, plural picture data related with one another are allocated to different locations in the data memory so that the picture data will be copied indifferent addresses in the data memory.

24 Claims, 29 Drawing Sheets

LUMINANCE SIGNAL

| H | | | | H+15 | |
|---|---|---|---|---|---|
| 0 | 1 | 2 | ... | 14 | 15 |
| 912 | 913 | 914 | ... | 926 | 927 |
| 1824 | 1825 | 1826 | ... | 1838 | 1839 |
| 2736 | 2737 | 2738 | ... | 2750 | 2751 |
| 3648 | 3649 | 3650 | ... | 3662 | 3663 |
| 4560 | 4561 | 4562 | ... | 4574 | 4575 |
| 5472 | 5473 | 5474 | ... | 5486 | 5487 |
| 6384 | 6385 | 6386 | ... | 6398 | 6399 |
| 7296 | 7297 | 7298 | ... | 7310 | 7311 |
| 16 | 17 | 18 | ... | 30 | 31 |
| 928 | 929 | 930 | ... | 942 | 943 |
| 1840 | 1841 | 1842 | ... | 1854 | 1855 |
| 2752 | 2753 | 2754 | ... | 2766 | 2767 |
| 3664 | 3665 | 3666 | ... | 3678 | 3679 |
| 4576 | 4577 | 4578 | ... | 4590 | 4591 |
| 5488 | 5489 | 5490 | ... | 5502 | 5503 |

V → (top row), V+15 → (bottom row)

FIG.23

FOR (YKptr + 912 × V + H)mod8192 = 4096

YKptr IS SET SO THAT (YKptr + 912 × V + H) mod8192 = n.
THAT IS THE ADDRESS OF WHICH YP (H,V) IN THE DRAWING
IS STORED ON DCACHE IS nTH ADDRESS

MEMORY ALLOCATION METHOD AND APPARATUS FOR COMPRESSION AND DECODING PICTURE DATA

BACKGROUND OF THE INVENTION

This invention relates to an information processing method used for compressing or decoding picture data.

DESCRIPTION OF THE RELATED ART

Presently, as the picture compressing system, MPEG1 and MPEG2, termed herein collectively as MPEG, proposed by the International Organization for Standardization (ISO), is used most frequently. The MPEG is one of standards for compressing the information by exploiting the correlation of a current picture with past and future pictures (motion compensation).

If three moving pictures are used, as shown in FIG. 1, the first, second and the third pictures are an I-picture, a B-picture and a P-picture, respectively. Data for compression are stored in, for example, a data memory of the information processing device in the sequence of an I-picture, a P-picture and a B-picture. For decoding, the information processing device decodes data of the I-picture followed by the P-picture. At this time, a prediction picture is taken out from the previously decoded I-picture for decoding the P-picture by addition with the prediction picture (prediction from the forward direction). Finally, the B-picture is decoded. At this time, a first prediction picture is taken out from the previously decoded I-picture (prediction from the forward direction). A second prediction picture is taken out from the previously decoded P-picture (prediction from the backward direction) and the B-picture is decoded by addition with an average value of the first and second prediction pictures. The display is in the sequence of the I-, P- and B-pictures.

The information processing device, performing this decoding, includes, for example, an instruction memory, a data memory in which compressed picture data is stored, a data cache, a register file, a logical arithmetic circuit and a control circuit. The register file, arithmetic circuit and a portion of the control circuit make up a central processing unit (CPU).

The instruction memory has stored therein a program for processing. This program reads out commands for reading out compressed data stored in, for example, a data memory for performing dequantization or inverse DCT and picture data stored in the data memory for motion compensation and sums the data to data obtained on dequantization or inverse DCT.

The data memory is a large-capacity memory and takes up excessive accessing time. Conversely, the data cache is a small-capacity memory with, for example, a capacity of 8192 words, and takes up less access time. Therefore, the data memory is connected to a bus via data cache and a portion of the data of the data memory is copied to the data cache and read out at an elevated speed from the data cache for loading the data over bus to the register file.

The data in the data memory is stored in an address ADRS mod 8192 in the data cache. The ADRS means an address of a location in the data memory holding the data. For example, data of the address 10, address 8202 and the address 16394 in the data memory are all stored in the address 10 of the data cache.

In the following explanation, it is assumed that the CPU accesses data of the address 10 in the data memory to perform calculations A (processing 1), then accesses the data of the address 8202 to perform calculations B (processing 2) and again accesses data of the address 10 (processing 3) to perform calculations C (processing 3).

First, the data of the address 10 of the data memory is read and copied in the address 10 of the data cache so that the calculations A are carried out over the bus within the register file and the logical arithmetic circuit (processing 1).

The data of the address 8202 of the data memory is then read and copied in the address 10 of the data cache so that the calculations B are carried out over the bus within the register file and the logical arithmetic circuit (processing 2).

At this time, the data which was at the address 10 in the cache memory 10, used in the processing 1, is overwritten by data in the address 8202 in the data memory. Therefore, there is no data in the data cache so that data of the address 10 is again read out from the data memory. This data is copied in the address 10 of the data cache and the calculations C are carried out in the register file and in the logical arithmetic circuit (processing 3). This data is copied in the address 10 of the data cache so that the calculations C are executed over bus in the register file and the logical arithmetic circuit (processing 3). Since it is necessary to read out data of the address 10 again from the data memory to copy the data in the address 10 of the data cache in the processing 3, there is produced "a cache error" in which the calculations are discontinued for the time being.

In the information processing device employing compressed data of the MPEG system, it is necessary to store an area for storage of three restored pictures, namely the I-picture, P-picture and the B-picture, in the data memory. In the data memory, the address Jptr to address (Jptr+589823), address Kptr to address (Kptr+589823) and address Lptr to address (Lptr+589823) are secured, as shown in FIG. 2. Since these areas are sequentially secured in the data memory, the address (Jptr+589823) is directly preceded by the address Kptr, while the address (Kptr+589823) is directly preceded by the address Lptr. In these three areas are stored restored pictures, namely the I-picture, P-picture and the B-picture.

For example, the pixel data YI(H, V), disposed at a position (H, V) of the decoded I-picture, are stored in an address (Jptr+1024×V+H) on the data memory, as shown in FIG. 3. Similarly, the pixel data YP(H, V), disposed at a position (H, V) of the decoded P-picture, are stored in an address (Kptr+1024×V+H) on the data memory, as shown in FIG. 4, while the pixel data YB(H, V), disposed at a position (H, V) of the decoded B-picture, are stored in an address (Lptr+1024×V+H) on the data memory, as shown in FIG. 5. Meanwhile, each picture is made up of transverse 1024 pixels and vertical 576 pixels.

It is assumed that the I-picture and the P-picture are already decoded and the B-picture is being decoded. Specifically, it is assumed that the I-picture is stored in the address Jptr to the address (Jptr+589823), the P-picture is stored in the address Kptr to the address (Kptr+589823), pixel data of the B-picture YB(H, V) is currently restored (recovered) and stored in the address (Lptr+1024×V+H) on the data memory.

In this case, it is necessary to read out prediction pixels for YB(H, V) for the dequantized and inversed DCTed values, from two pictures, namely the I-picture and the P-picture, add an average of the two prediction pixels to the dequantized and inversed DCTed values and to store the result of addition in the address (Lptr+1024×V+H).

The prediction pixel in the I-picture for YB(H, V) is usually a pixel at a position (H, V) of the I-picture because only a small portion is moving in a moving picture the major portion of which is a still picture. Therefore, it occurs frequently that the pixel at the position (H, V) is at the same position even if it belongs to some other picture. This means that the motion vector is frequently equal to zero. Similarly, the prediction pixel in the P-picture for YB(H, V) is the pixel at the (H, V) position in the P-picture.

Thus, for restoring YB(H, V), YI(H, V) and YP(H, V) are first read out. An average value of the two pixel data thus read out is calculated. This average value is summed to the dequantized and inverse DCTed values and the resulting sum is stored in the address (Lptr+1024×V+H) as shown in FIG. 6.

Meanwhile, reading out the pixel data YI(H, V) is accessing the address (Jptr+1024×V+H) for reading out the data stored therein. Similarly, reading out the pixel data YP(H, V) is accessing the address (Kptr+1024×V+H) for reading out the data stored therein. Since $$(Jptr + 1024 \times V + H) \bmod 8192$$
$$= (Kptr + 1024 \times V + H) \bmod 8192$$
$$= (Lptr + 1024 \times V + H) \bmod 8192$$

three pixel data of YI(H, V), YP(H, V) and YB(H, V) are copied in the same address (address Dptr) in the data memory. This produces cache error.

That is, if an area on the data memory for storage of picture data is secured at random, cache errors are frequently produced in the decoding process thus retarding the overall operation and disabling high-speed processing.

SUMMARY OF THE INVENTION

It is therefore an object of the present invention to provide an information processing method and apparatus whereby, at the time of securing an area for storage of restored picture data, high-speed processing is enabled without producing cache errors.

In one aspect, the present invention provides an information processing method in which luminance signals and color signals are stored in a data memory are copied in a data cache and pre-set processing is executed on the luminance signals and color signals copied in the data cache, in which the method includes allocating sites of storage on the data memory of the luminance signals and the color signals associated with the luminance signals so that the luminance signals and the color signals associated with the luminance signals will be copied in different locations in the data cache, and storing the luminance signals and color signals thus allocated in the data memory, reading out the luminance signals stored in a first location in the data memory and color signals associated with the luminance signals, stored in a second location in the data memory, copying the luminance signals and color signals in different locations in the data cache, and performing pre-set processing on the luminance signals and the color signals thus copied in the different locations in the data cache.

In another aspect, the present invention provides an information processing method in which luminance signals and color signals stored in a data memory are copied in a data cache and in which second picture data are processed in a pre-set manner with reference being had to the first picture data copied in the data cache, in which the method includes allocating the first picture data and the second picture data in a first location and in a second location in the data memory so that first picture data and second picture data associated with respective pixels will be copied in a first address and in a second address of the data cache when accessing pixels of the second picture data and pixels of the first picture data referred to at a higher probability in the course of processing the pixels of the second picture data, and storing the allocated first and second picture data, reading out the first and second picture data stored in the data memory for copying in a first address and a second address of the data cache, and performing pre-set processing on the first and second picture data thus copied in the first and second addresses.

In still another aspect, the present invention provides an information processing method in which first picture data and second picture data stored in a data memory are copied in a data cache and in which third picture data are processed in a pre-set manner with reference being had to the first picture data and the second picture data copied in the data cache, in which the method includes storing the first picture data and the third picture data associated with respective pixels in a first location and in a third location in the data memory so that, if pixels of the first picture data are pixels referred to with a high probability, the first picture data and the third picture data associated with respective pixels will be copied in the first address and in the third address in the data cache when accessing the pixels of the first picture data and the pixels of the third picture data, storing the second picture data and the third picture data in a second location and in a third location in the data cache so that, if pixels of the first picture data are pixels referred to with a high probability, the second picture data and the third picture data associated with respective pixels will be copied in the second address and in the third address in the data cache when accessing the pixels of the second picture data and the pixels of the third picture data, reading out the first to third picture data stored in the data memory for copying in first to third addresses of the data cache and performing pre-set processing on the first to third picture data thus copied in the first to third addresses.

In still another aspect, the present invention provides an information processing apparatus in which luminance signals and color signals stored in a data memory are copied in a data cache and pre-set processing is executed on the luminance signals and color signals copied in the data cache, wherein the data memory stores the luminance signals and color signals associated with the luminance signals in storage sites allocated so that the luminance signals and the color signals associated with these luminance signals will be copied in different locations in the data cache, and wherein information processing means performs pre-set processing on the luminance signals and the color signals read out from the data memory so as to be copied in different locations in the data cache.

In still another aspect, the present invention provides an information processing apparatus in which first picture data stored in a data memory are copied in a data cache and in which second picture data are processed in a pre-set manner with reference being had to the first picture data copied in the data cache, wherein the data memory allocates the first picture data and the second picture data in a first location and in a second location so that first picture data and second picture data associated with respective pixels will be copied in a first address and in a second address of the data cache when accessing first pixels of the first picture data referred to at a higher probability in the course of processing of the second pixels of the second picture data, the data memory then storing the allocated first and second picture data, and wherein the information processing means executes pre-set processing on the first picture data and the second picture data read out from the data memory and copied in first and second addressees of the data cache.

In still another aspect, the present invention provides an information processing apparatus in which first picture data and second picture data read out from a data memory are copied in a data cache and in which third picture data are processed in a pre-set manner with reference being had to the first picture data and the second picture copied in the data cache, wherein the data memory allocates the first picture data and the third picture data in a first location and in a third location so that, if pixels of the first picture data are pixels referred to with a high probability, the first picture data and the third picture data associated with respective pixels will be copied in the first address and in the third address in the data cache when accessing the pixels of the first picture data and the pixels of the third picture data, the data memory then storing the allocated first and third picture data, and wherein the data memory allocates the second picture data and the third picture data in a second location and in a third location so that, if pixels of the second picture data are pixels referred to with a high probability, the second picture data and the third picture data associated with respective pixels will be copied in the second addresses and in the third addresses in the data cache when accessing the pixels of the first picture data and the pixels of the third picture data, the data memory then storing the allocated first and third picture data. The information processing means executes pre-set processing on the first to third picture data read out from the data memory and copied in first to third addressees of the data cache.

In still another aspect, the present invention provides a programmable storage device readable by a machine, tangibly embodying s program d instructions executable by the machine to perform method steps for processing luminance signals and chroma signals associated with the luminance signals, in which the method steps include allocating sites of storage on the data memory for the luminance signals and the color signals associated with the luminance signals so that the luminance signals and the color signals will be copied in different locations in the data cache, and storing the luminance signals and color signals thus allocated in the data memory, reading out the luminance signals stored in a first location in the data memory and the color signals associated with the luminance signals, stored in a second location in the data memory, copying the luminance signals and color signals in different locations in the data cache, and performing pre-set processing on the luminance signals and the color signals thus copied in the different locations in the data cache.

In still another aspect, the present invention provides a programmable storage device readable by a machine, tangibly embodying a program of instructions executable by the machine to perform method steps for processing luminance signals and chroma signals associated with the luminance signals, in which the method steps includes allocating first picture data and second picture data in a first location and in a second location in the data memory so that the first picture data and the second picture data associated with respective pixels will be copied in a first address and in a second address of the data cache when accessing pixels of the second picture data and pixels of the first picture data referred to at a higher probability in the course of processing the pixels of the second picture data, and storing the allocated first and second picture data, reading out the first and second picture data stored in the data memory for copying in a first address and a second address of the data cache, and performing pre-set processing on the first and second picture data thus copied in the first and second addresses.

In still another aspect, the present invention provides a program storage device readable by a machine, tangibly embodying a program of instructions by the machine to perform method steps for processing a third picture data by referring to first and second picture data, in which the method steps include storing the first picture data and the third picture data associated with respective pixels in a first location and in a third location in the data memory so that, if pixels of the first picture data are pixels referred to with a high probability, the first picture data and the third picture data associated with respective pixels will be copied in the first address and in the third address in the data cache when accessing the pixels of the first picture data and the pixels of the third picture data, storing the second picture data and the third picture data in a second location and in a third location in the data cache so that, if pixels of the second picture data are pixels referred to with a high probability, the second picture data and the third picture data associated with respective pixels will be copied in the second address and in the third address in the data cache when accessing the pixels of the second picture data and the pixels of the third picture data, reading out the first to third picture data stored in the data memory, copying the first to third picture data thus read out in first to third addresses of the data cache and performing pre-set processing on the first to third picture data thus copied in the first to third addresses.

With the above-described information processing method according to the present invention, since the luminance signal and the chroma signals are stored in the data memory so that these signals will be copied in different locations in the data cache, there is no necessity of repeatedly reading out the luminance signal and the chroma signals, thus eliminating caching errors of transiently interrupting the processing for assuring high-speed data processing.

In the information processing method according to the present invention, first picture data and second picture data are allocated in a first location and in a second location in the data memory, respectively, so that, if pixels of the second picture data and pixels of the first picture data referred to with a high probability in the course of processing the pixels of the second picture data, the first picture data and the second picture data of the data cache associated with respective pixels will be copied in the first address and in the second address of the data cache, thereby evading the first picture data and the second picture data overwriting each other.

In the information processing method according to the present invention, including allocating the first picture data and the third picture data in a first location and in a third location in the data memory so that first picture data and the third picture data associated with respective pixels will be copied in a first address and in a third address of the data cache when accessing pixels of the first picture data and pixels of the third picture data, and storing the allocated first and second picture data, and allocating the second picture data and the third picture data in a second location and in a third location in the data memory so that second picture data and the third picture data associated with respective pixels will be copied in a second address and in a third address of the data cache when accessing pixels of the second picture data and pixels of the third picture data, and storing the allocated second and second picture data, thus evading the risk of the first picture data, second picture data and the third picture data overwriting one another in the data cache while eliminating caching errors of transiently interrupting the processing for assuring high-speed data processing. The result is that there is no necessity of repeatedly reading out the luminance signal and the chroma signals, so that caching errors of transiently interrupting the processing is eliminated for assuring high-speed data processing.

In the information processing method according to the present invention, the first picture data and the second picture data are allocated and stored in a first location and in a second location in the data memory so that first picture data and second picture data associated with respective pixels will be copied in a first address and in a second address of the data cache when accessing pixels of the second picture data and pixels of the first picture data referred to at a higher probability in the course of processing the pixels of the second picture data, thus evading the risk of the first picture data and the second picture data overwriting one another in the data cache. The result is that caching errors of transiently interrupting the processing is eliminated for assuring high-speed data processing. There is no necessity of repeatedly reading out the luminance signal and the chroma signals, so that caching errors of transiently interrupting the processing is eliminated for assuring high-speed data processing.

In the information processing method according to the present invention, the first picture data and the third picture data associated with respective pixels are stored in a first location and in a third location in the data memory so that, if pixels of the first picture data are pixels referred to with a high probability, the first picture data and the third picture data associated with respective pixels will be copied in the first address and in the third address in the data cache when accessing the pixels of the first picture data and the pixels of the third picture data, while the second picture data and the third picture data are stored in a second location and in a third location in the data cache so that, if pixels of the first picture data are pixels referred to with a high probability, the second picture data and the third picture data associated with respective pixels will be copied in the second address and in the third address in the data cache when accessing the pixels of the second picture data and the pixels of the third picture data, thus evading the risk of the first picture data, second picture data and the third picture data overwriting one another in the data cache while eliminating caching errors of transiently interrupting the processing for assuring high-speed data processing. The result is that there is no necessity of repeatedly reading out the luminance signal and the chroma signals, so that caching errors of transiently interrupting the processing is eliminated for assuring high-speed data processing.

In the information processing method according to the present invention, the first picture data and the second picture data are allocated and stored in a first location and in a second location in the data memory so that first picture data and second picture data associated with respective pixels will be copied in a first address and in a second address of the data cache when accessing pixels of the second picture data and pixels of the first picture data referred to at a higher probability in the course of processing the pixels of the second picture data, thus evading the risk of the first picture data and the second picture data overwriting one another in the data cache. The result is that caching errors of transiently interrupting the processing is eliminated for assuring high-speed data processing. There is no necessity of repeatedly reading out the luminance signal and the chroma signals, so that caching errors of transiently interrupting the processing is eliminated for assuring high-speed data processing.

BRIEF DESCRIPTION OF THE DRAWINGS

FIG. 23 shows the state in which luminance signals from the data memory have been copied to the data cache.

DESCRIPTION OF THE PREFERRED EMBODIMENTS

Figure 1:
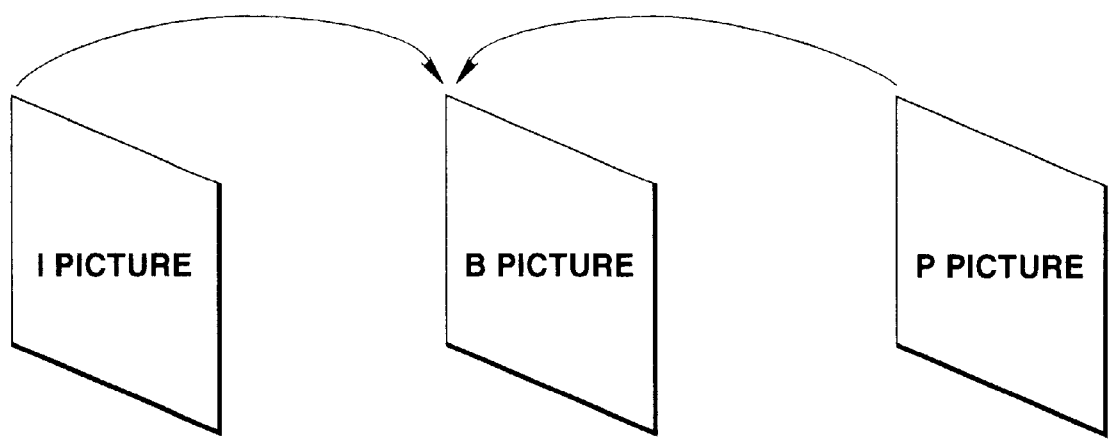
FIG. 1 illustrates the general relation between an I-picture, P-picture and a B-picture.
Figure 2:
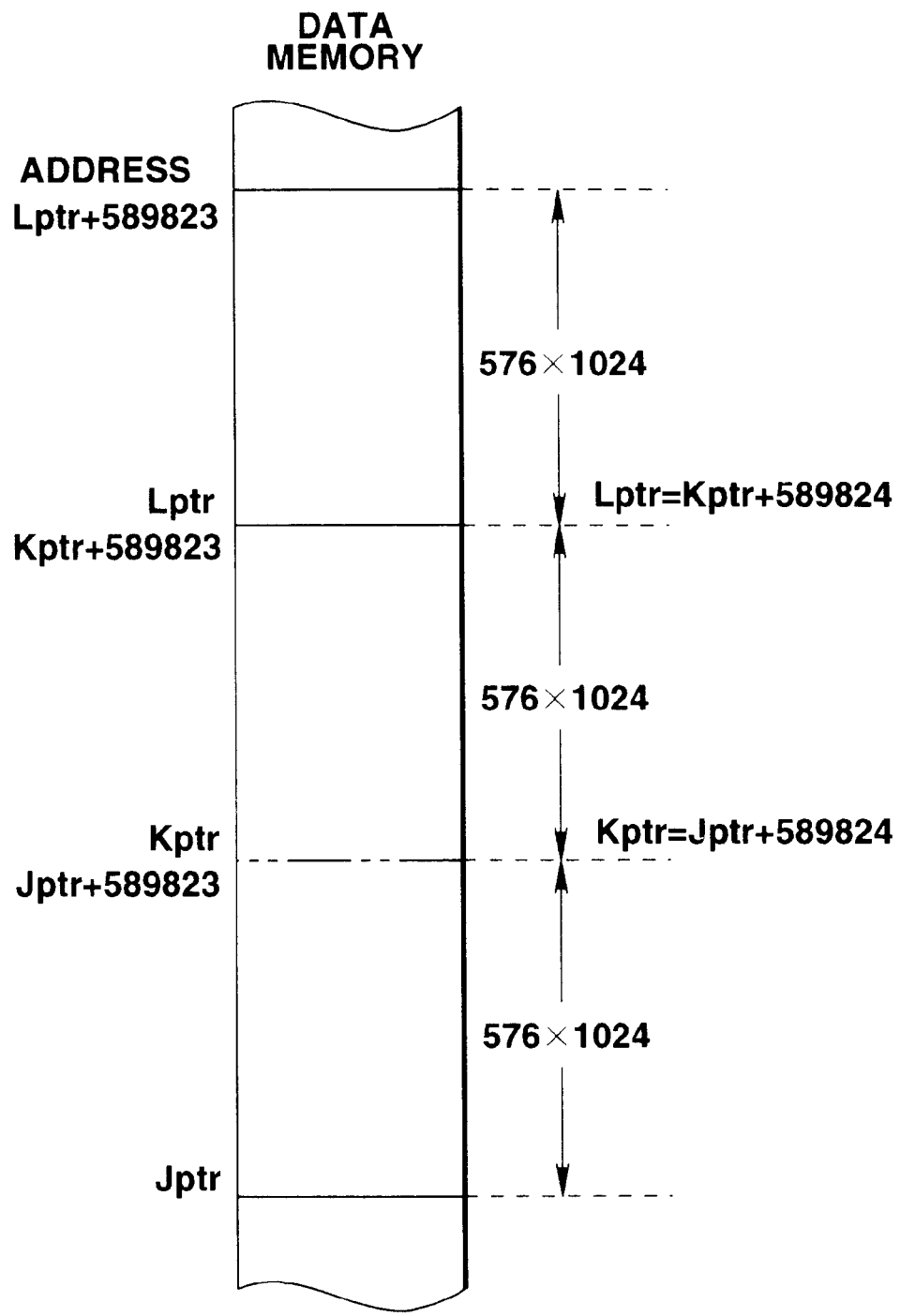
FIG. 2 illustrates addresses conventionally used for storage of the I-picture, P-picture and the B-picture stored in the data memory.
Figure 3:
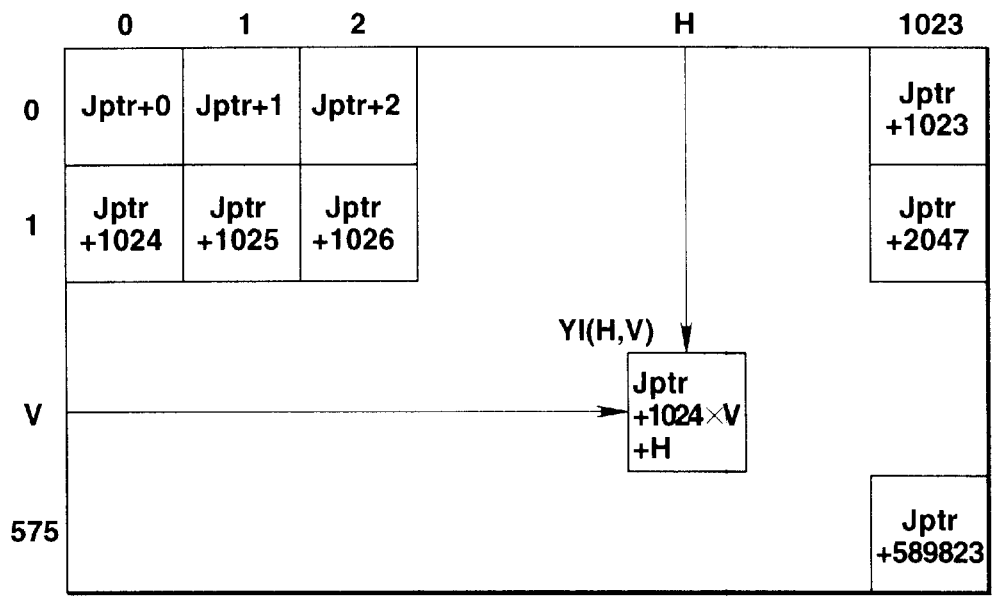
FIG. 3 shows the state in which luminance signals of an I-picture are stored in the data memory.
Figure 4:
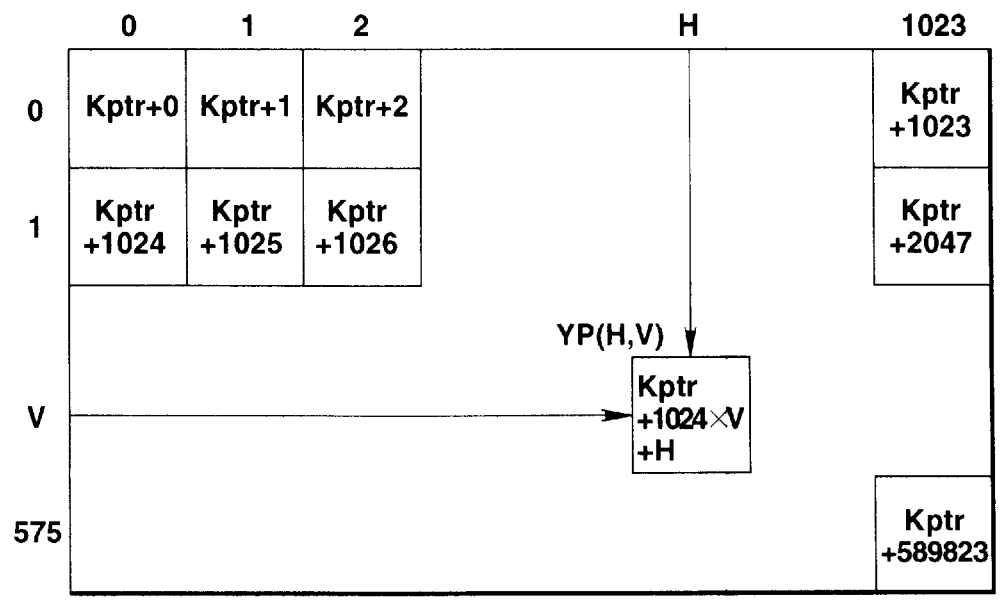
FIG. 4 shows the state in which luminance signals of an P-picture are stored in the data memory.
Figure 5:
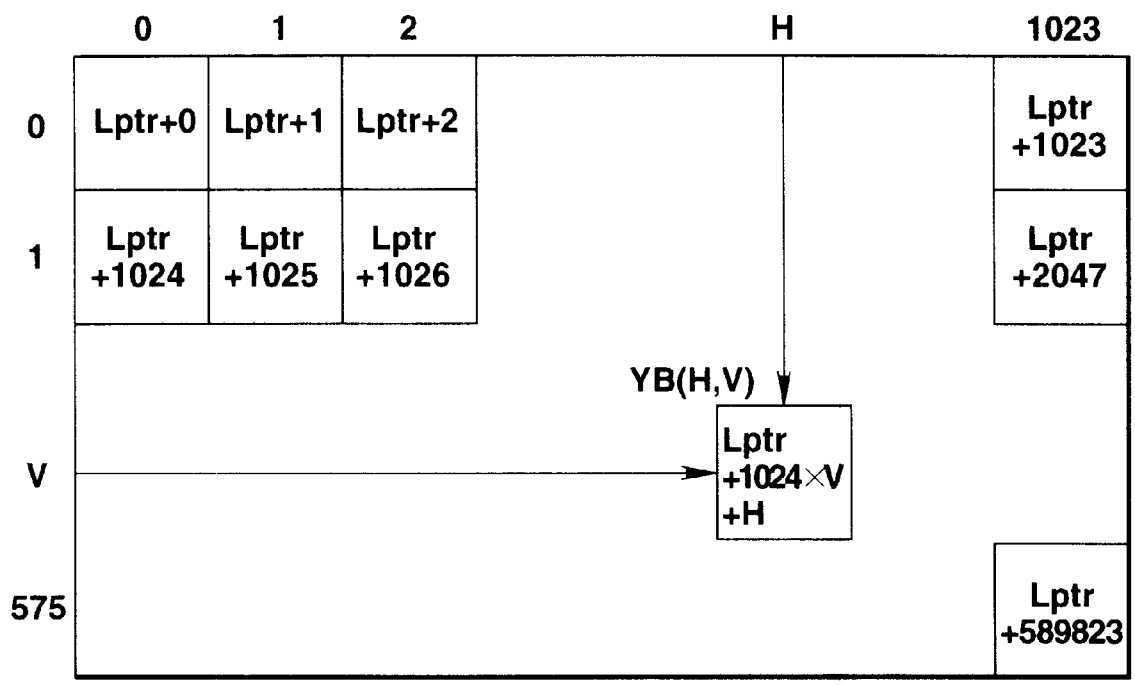
FIG. 5 shows the state in which luminance signals of an B-picture are stored in the data memory.
Figure 6:
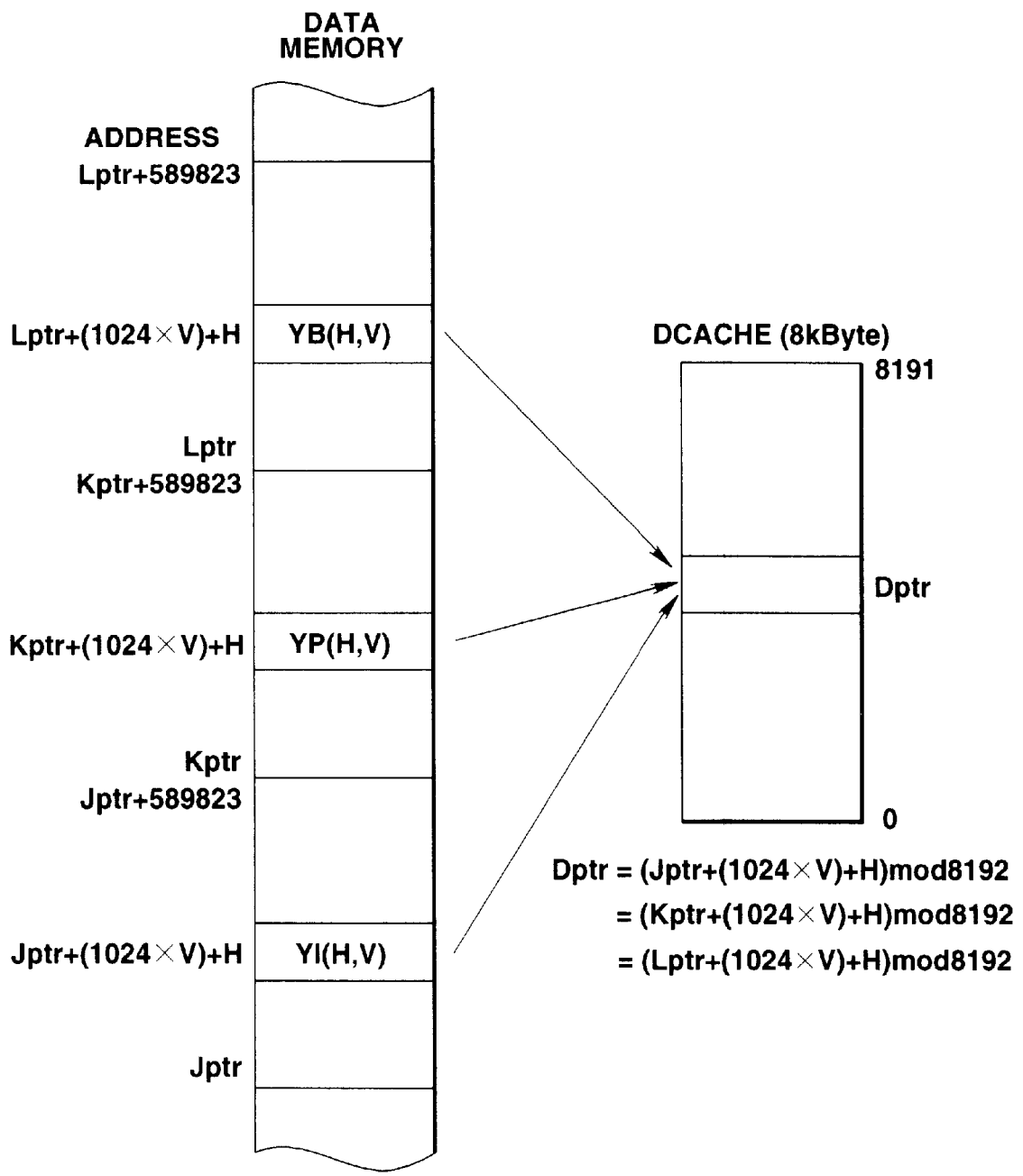
FIG. 6 shows the state in which picture data of an I-picture, P-picture and a B-picture have been copied in the same location in the data memory.

Referring to the drawings, preferred embodiments of the present invention will be explained in detail. The present invention is applied with advantage to restoration of data compressed by, for example, the MPEG (Moving Picture Experts group) 2.

Currently, the MPEG1 and MPEG2, collectively referred to herein as MPEG, proposed by ISO, are used most frequently as the picture compression system. The MPEG is among the information compression systems in which the correlation of a current picture with past and future pictures is exploited (motion compensation is performed) for compressing the information.

Figure 7:
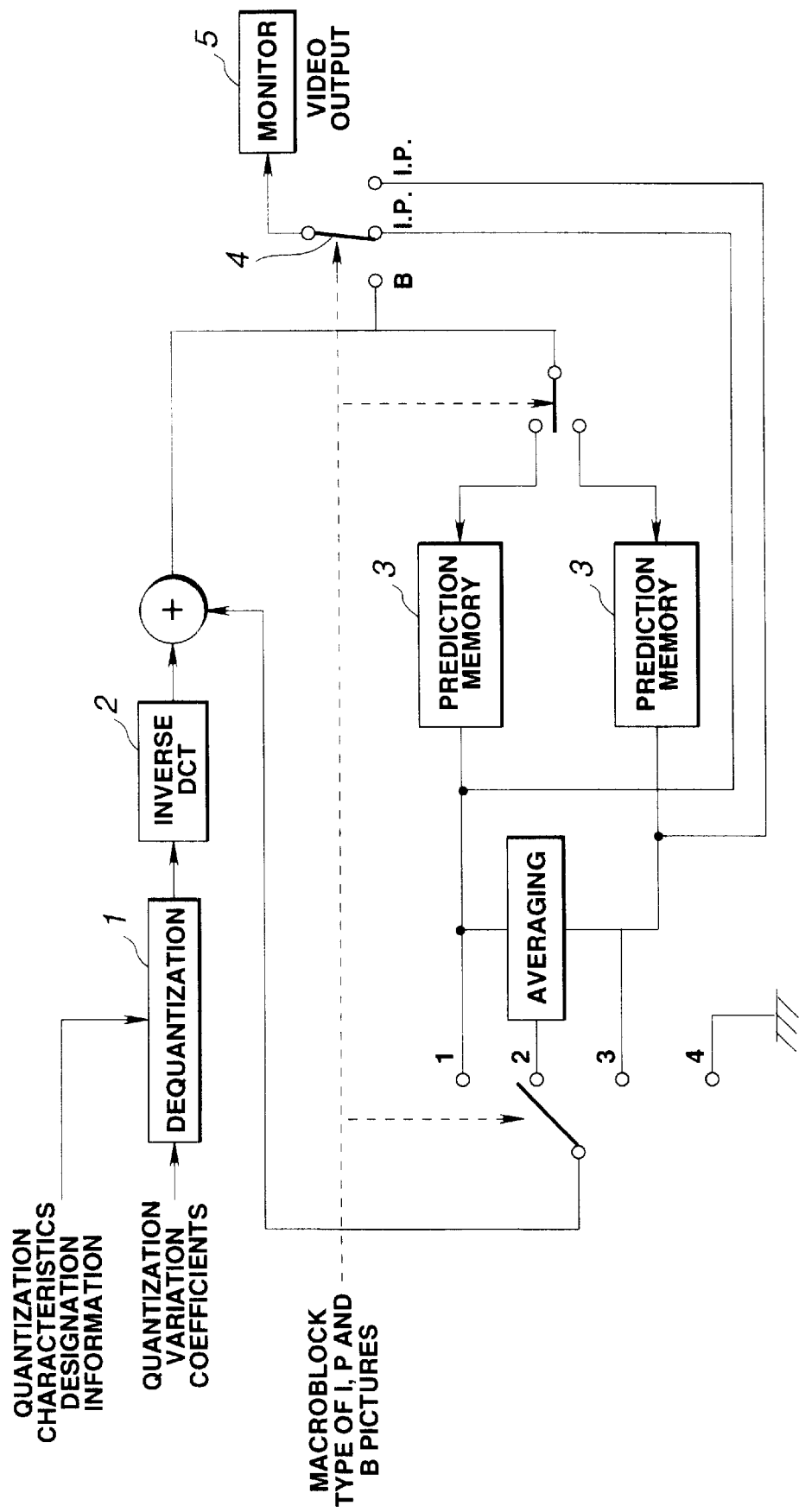
FIG. 7 is a schematic block diagram showing the structure of a generic information processing device.

In the MPEG system, compressed data is dequantized by a dequantization circuit 1, as shown in FIG. 7, and inverse-DCTed by an inverse DCT (discrete cosine transform) circuit 2. The resulting data is summed to the prediction picture read out as the occasion may remand from the picture stored in prediction memories 3, 3 by way of motion compensation for restoring the picture. The I-picture is restored by dequantization and inverse DCT without motion compensation. The P-picture is motion-compensated by the I-picture or P-picture previous to itself for restoration. That is, the P-picture is restored by a prediction picture taken out from the I-picture and summed to compressed data dequantized and inverse DCTed by way of restoration. The B-picture is motion-compensated by both an I-picture or a P-picture previous to itself and a future P-picture or I-picture by way of restoration. That is, the B-picture is restored by summing an average value of a first prediction picture taken out from the previous I-picture or P-picture and a second prediction picture taken out from the future p-picture to dequantized and inverse DCTed data. The data of the restored picture is outputted via switch 4 and thence fed to the monitor 5.

Figure 8:
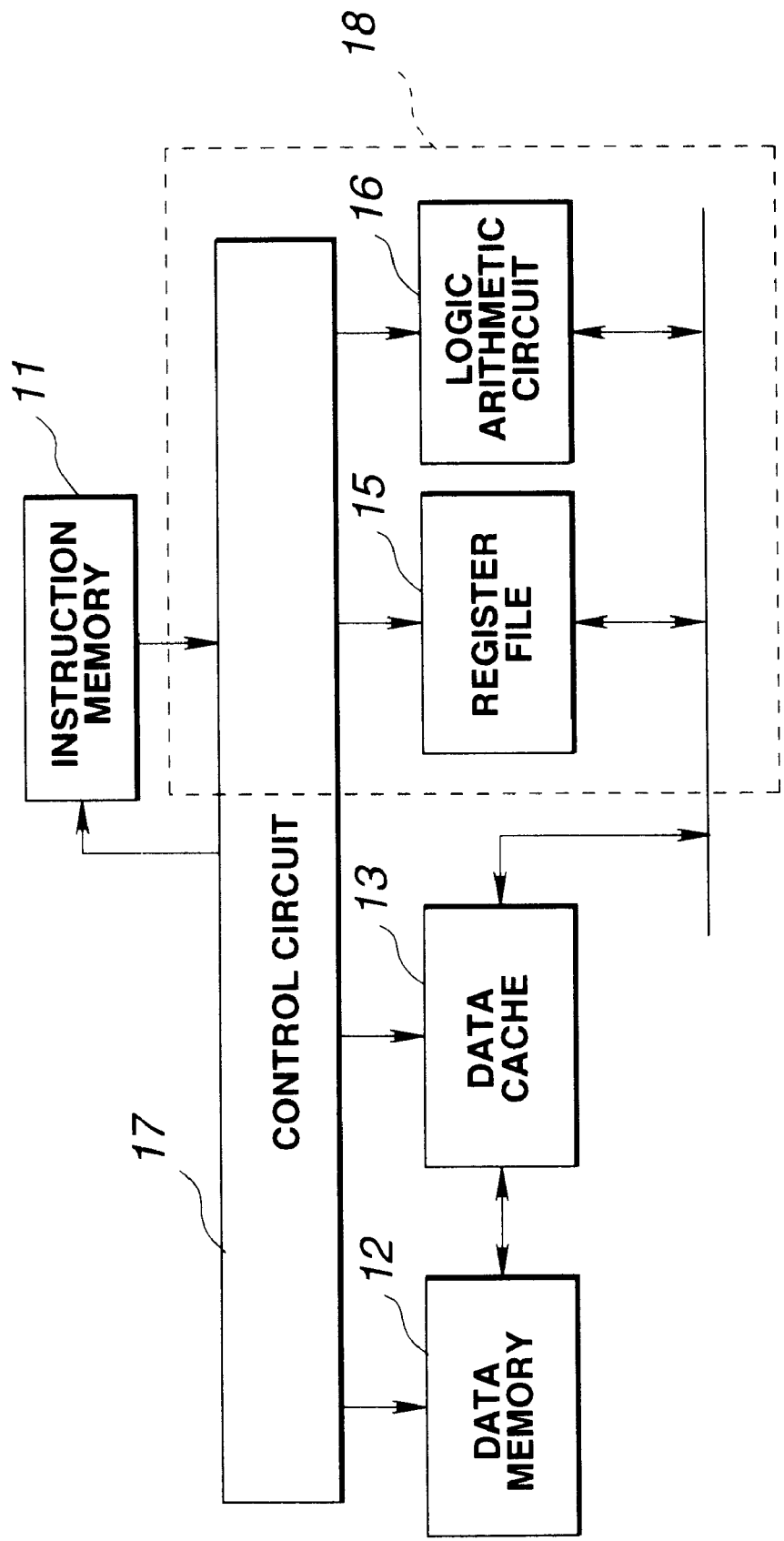
FIG. 8 is a block diagram showing a specified structure of an information processing device according to the present invention.
Figure 9:
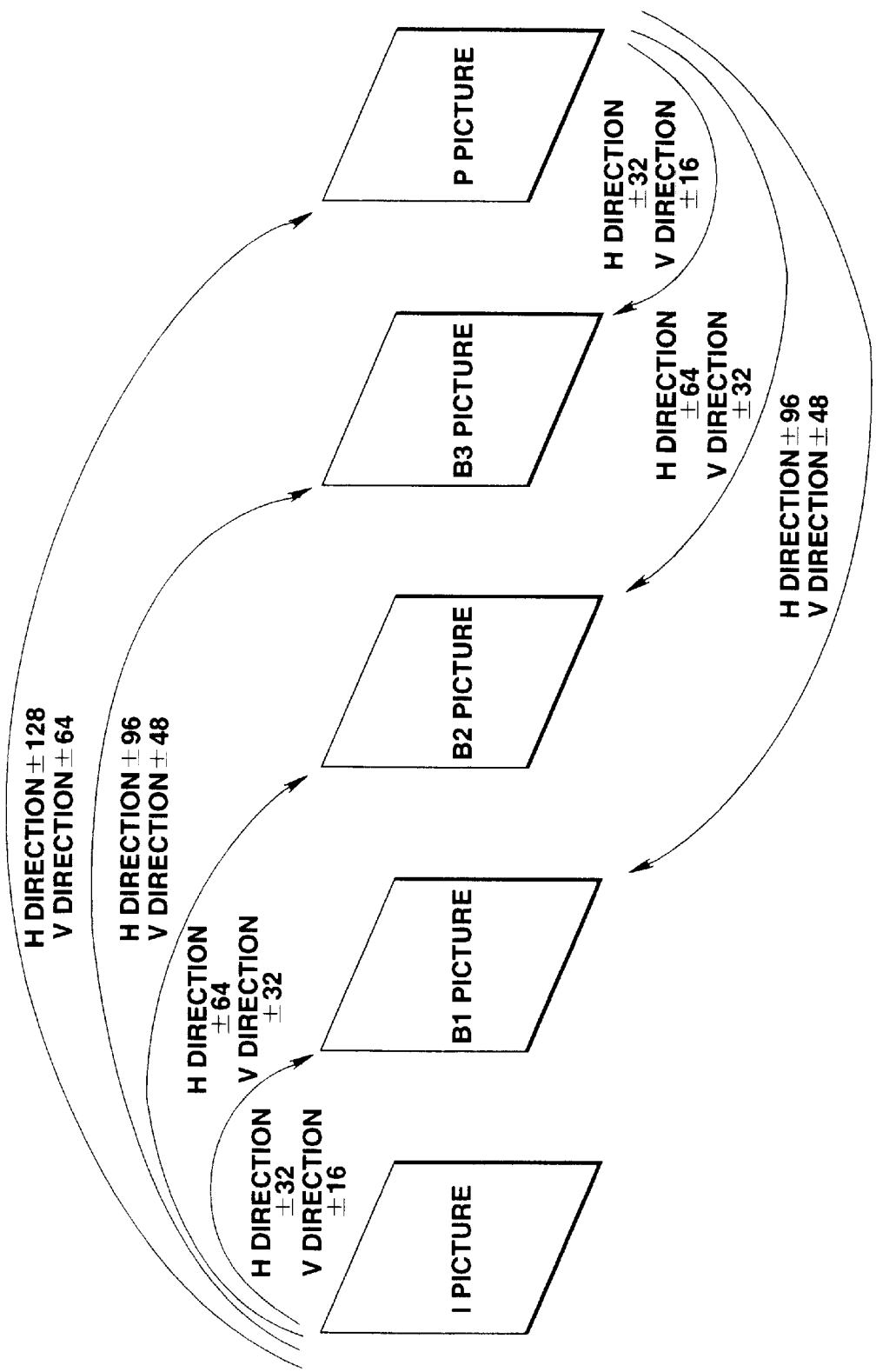
FIG. 9 shows the relation between the I-picture, B1 picture, B2 picture B3 picture and the P-picture decoded by the information processing device of FIG. 8.

An information processing device, inclusive of the device of FIG. 7, is made up of an instruction memory 11, a data memory 12 having compressed data stored therein, a data cache 13, a register file 15, a logical arithmetic circuit 16 and a control circuit 17, as shown in FIG. 8. The register file 15, arithmetic circuit 16 and a portion of the control circuit 17 make up a central processing unit (CPU) 18.

The instruction memory 11 has stored therein a program for processing. This program reads out commands for reading out compressed data stored in, for example, a data memory for performing dequantization or inverse DCT and picture data stored in the data memory for motion compensation and sums these data to data obtained on dequantization or inverse DCT as described above.

The data memory 12 is a large-capacity memory and takes up excessive accessing time. Conversely, the data cache 13 is a small-capacity memory with, for example, a capacity of 8192 words, and takes up less access time. Therefore, the data memory 12 is connected to a bus 14 via data cache 13 and a portion of the data of the data memory 12 is copied to the data cache 13 and read out at an elevated speed from the data cache for loading the data over bus to the register file 15.

The information processing device can restore five moving pictures. The first one is an I-picture, the second one is a B-picture (referred to herein as a B1 picture), a third one is a B-picture (referred to herein as a B2 picture), a fourth one is a B-picture (referred to herein as a B3 picture), and the fifth one is a P-picture. The compressed data is stored in the data memory 12 in the sequence of the I-picture, P-picture, B1-picture, B2-picture and the B-3 picture.

In decoding, the information processing device first decodes data of the I-picture. Next, the P-picture is decoded. The prediction picture is taken out from the previously decoded I-picture and summed to the compressed picture data (prediction from the forward direction). The B1-picture is then decoded. At this time, the first prediction picture is taken out from the initially decoded I-picture for prediction from the forward direction, while the second prediction picture is taken out from the previously restored P-picture for prediction from the backward direction. The average value of the first and second prediction pictures is summed to compressed data for decoding the B1 picture.

The information processing device then decodes the B2-picture. At this time, the first prediction picture (picture of prediction from the forward direction) is taken out from the initially decoded I-picture, while the second prediction picture (picture of prediction from the backward direction) is taken out from the previously restored picture, and the B2-picture is decoded by adding the compressed data to the average value of the first and second prediction pictures.

Finally, the B3-picture is decoded from the information processing device. At this time, the first prediction picture (picture of prediction from the forward direction) is taken out from the initially decoded I-picture, while the second prediction picture (picture of prediction from the backward direction) is taken out from the previously restored picture, and the B3-picture is decoded by summing the compressed data to the average value of the first and second prediction pictures. The display sequence is the I-picture, B1-picture, B2-picture, B3-picture and the P-picture.

It should be noted that it is usually approximately ±32 pixels in the transverse direction and ±16 pixels in the longitudinal direction that are moved in a frame of a moving picture. If the position of the current pixel is (H, V) and the motion vector is (mH, mV), the prediction pixel for the pixel (H, V) is the pixel at (H+mH, V+mV) in the I- or P-picture.

Therefore, if picture data of the above five pictures are represented using the motion vector which is the difference vector between the position of the current pixel and the position of the prediction pixel, the prediction pixels for the pixel data YP(H, V) in the P-picture are those pixels which are in a range of (H−128 to H+128, V−64 to V+64) of the I-picture, because the P-picture and the I-picture are spaced apart from each other by four pictures.

The prediction pixels for the pixel data YB1(H, V) in the B1 picture are those pixels which are in a range of (H−32 to H+32, V−16 to V+16) of the I-picture. Also, since the B1 picture is separated from the P-picture by three pictures, the prediction pixels for th pixel data YB1(H, V) in the B1 picture are those pixels which are within the range of (H−96 to H+96, V−48 to V+48) from the P-picture.

The prediction pixels for the pixel data YB2(H, V) within the B3-picture are those pixels which are within the range of from (H−64 to H+64, V−32 to V+32) of the I-picture and within the range of from (H−64 to H+64, V−32 to V+32) of the P-picture, because the B3-picture is separated from the I-picture by three pictures.

The prediction pixels for the pixel data YB3(H, V) within the B3-picture are those pixels which are within the range of from (H−96 to H+96, V−48 to V+48) of the I-picture and within the range of from (H−32 to H+32, V−16 to V+16) of the P-picture, because the B3-picture is separated from the I-picture by three pictures.

In the above-described information processing device, it is necessary to secure an area in the data memory 12 for storage of three pictures, namely the restored I-picture, a restored P-picture and a restored B-picture. The reason that there is no necessity of securing an area for each of the B1-, B2- and B3-pictures is that the B1-picture is outputted immediately after it is stored in the third area so that the third area can be safely overwritten by the next B2-picture. Similarly, the B2-picture is outputted immediately after it is stored in the third area so that the third area can be safely overwritten by the next B2-picture. Thus, the B1-, B2- and B3-pictures can be stored in a sole area usable in common by these three pictures.

Figure 10:
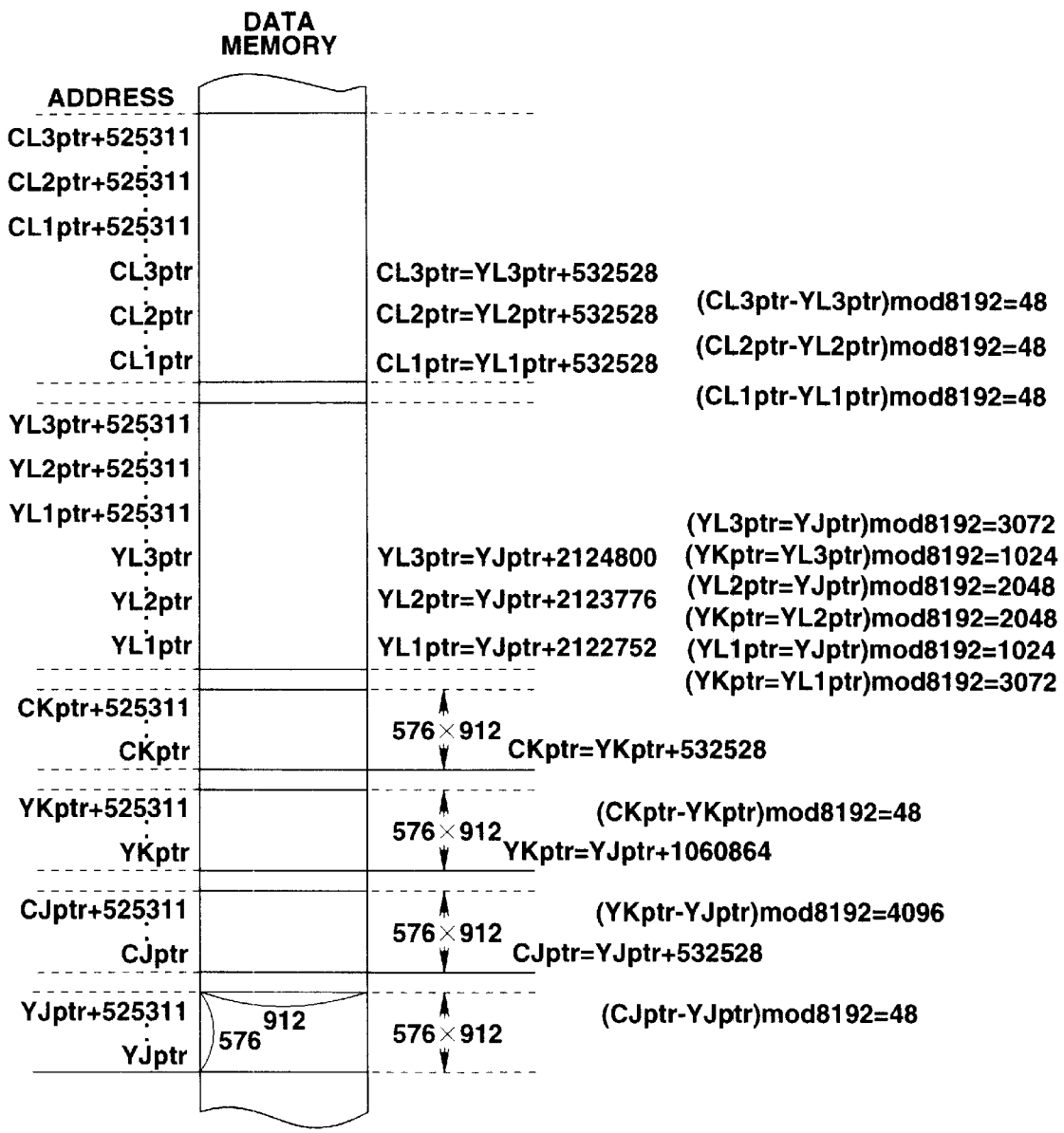
FIG. 10 shows an address in the data memory of the information processing device of FIG. 8 in which is stored a decoded picture.

The first area, that is the area for storage of the restored I-picture, is an area of the address YJptr to the address (YJptr+525311) and the address CJptr to the address (CJptr+525311), as shown in FIG. 10. The luminance signal data and the chroma signal data are stored in the address YJptr to the address (YJptr+525311) and the address CJptr to the address (CJptr+525311), respectively, wherein $CJptr=YJptr+5352528$ $(CJptr-YJptr)\mathrm{mod}8192=48.$ The area in which the second picture, that is the restored P-picture, is stored, is an area of the address YKptr to the address (YKptr+525311) and the address CKptr to the address (CKptr+525311). The luminance signal data and the chroma signal data are stored in the areas of the address YKptr to the address (YKptr+525311) and the address CKptr to the address (CKptr+525311), respectively, where $CKptr=YKptr+532528$ $YKptr=YJptr+1060864$ $(CKptr-YKptr)\mathrm{mod}8192=48$ $(YKptr-YJptr)\mathrm{mod}8192=4096.$ The area for the third picture is the address YL1ptr to (YL3ptr+525311) and address CL1ptr to (CL3ptr+525311), and is broader than the area for the above two areas, as shown in FIG. 10.

The B1 picture has its luminance signals stored in the address YL1ptr to the address (YL1ptr+525311), while having its chroma signals stored in the address CL1ptr to the address (CL1ptr+525311).

The B2 picture has its luminance signals stored in the address YL2ptr to the address (YL2ptr+525311), while having its chroma signals stored in the address CL2ptr to the address (CL2ptr+525311).

The B3 picture has its luminance signals stored in the address YL3ptr to the address (YL3ptr+525311), while having its chroma signals stored in the address CL3ptr to the address (CL3ptr+525311).

Meanwhile, $CL1ptr=YL1ptr+532528$ $YL1ptr=YJptr+2122752$ $CL2ptr=YL2ptr+532528$ $YL2prr=YJptr+2123776$

*CL3ptr=YL3ptr*+532528

*YL3ptr=YJptr*+2124800.

On the other hand, (*CCL1ptr−YL1ptr*)mod8129=48

(*YL1ptr−YJptr*)mod8192=1024

(*YKptr−YL1ptr*)mod8192=3072

(*CL2ptr−YL2ptr*)mod8192=48

(*YL2ptr−YJptr*)mod8192=2048

(*YKptr−YL2ptr*)mod8192=2048

(*CL3ptr−YL3ptr*)mod8192=48

(*YL3ptr−YJptr*)mod8192=3072

(*YKptr−YL3ptr*)mod8192=1024.

Figure 11:
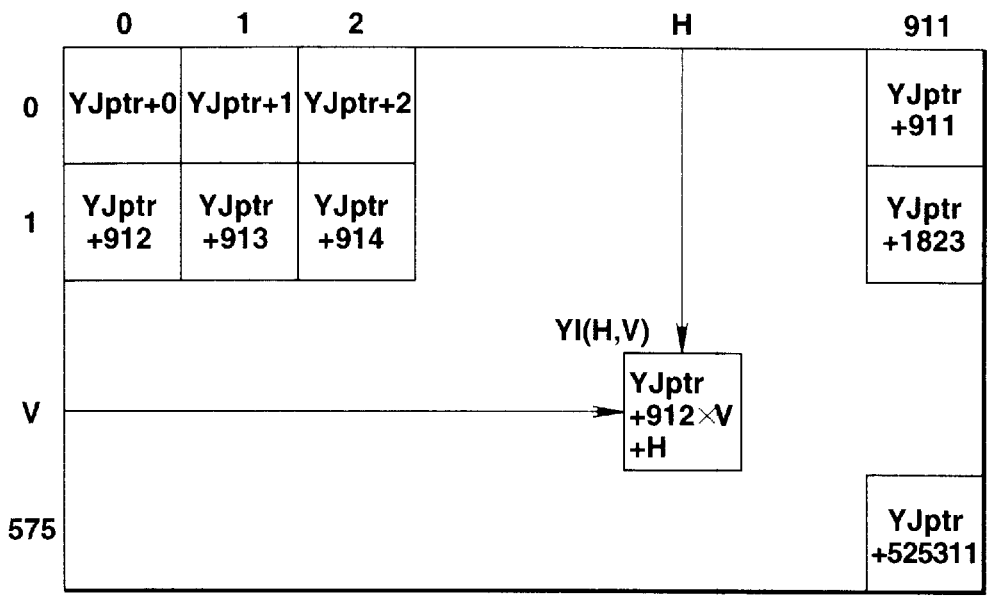
FIG. 11 shows the state in which picture data YI(H, V) of luminance signals of the I-picture are stored in the data memory.

Specifically, the pixel data YI(H, V) of the luminance signal at the position (H, V) within the I-picture is stored in, for example, the address (YJptr+912×V+H) on the data memory 12, as shown in FIG. 11. The luminance signals of the respective pictures are each made up of transverse 912 pixels and longitudinal 576 pixels. That is, the upper left end pixel of the I-picture is stored in the address YJPTR, while the lower right end pixel of the I-picture is stored in the address (YJptr+525311).

Figure 12:
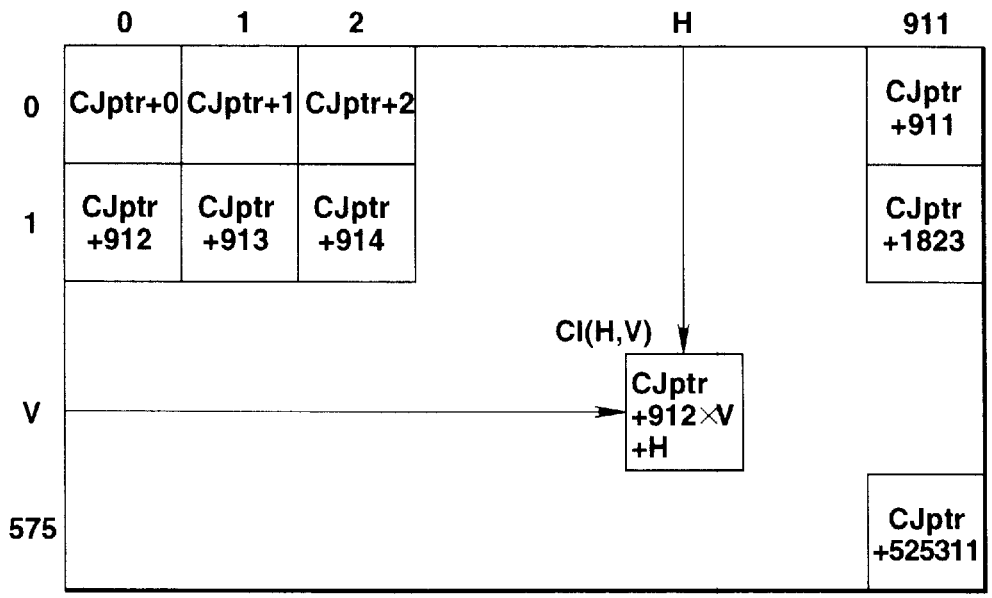
FIG. 12 shows the state in which picture data CI(H, V) of chroma signals of the I-picture are stored in the data memory.

The pixel data CI(H, V) of the chroma signal at the position (H, V) within the I-picture is stored in, for example, the address (CJptr+912×V+H) on the data memory, as shown in FIG. 12. The chroma signals of the respective pictures are each made up of transverse 912 pixels and longitudinal 576 pixels. That is, the upper left end pixel of the I-picture is stored in the address CJptr, while the lower right end pixel of the I-picture is stored in the address (CJptr+525311).

In the case of the 4:2:2 format, there are two sorts of the chroma signals (Cb and Cr signals), each having transverse pixels the number of which is one-half that of the luminance signals. In this case, the pixel data CI(2×h, V) of the Cb signal are stored in the h'th position as counted from left end and in the V'th position as counted from the upper end, while the pixel data of the Cb signal CI(2×h+1, V) of the Cr signal is stored in the h'th position as counted from left end and in the V'th position as counted from the upper end. That is, the pixel data of the Cb signal are stored in the address CJptr, address (CJptr+2), . . . , (CJptr+912), (CJptr+914), . . . , while the pixel data of the Cr signal are stored in the address (CJptr+1), address (CJptr+3), . . . , (CJptr+913), (CJptr+915), . . . . In the case of the 4:2:0 format, there are two sorts of the chroma signals (Cb and Cr signals), each having transverse pixels the number of which is one-half that of the luminance signals and longitudinal pixels the number of which is one-half that of the luminance signals. In this case, the pixel data CI(2×h+1, 2×v) of the Cr signal are stored in the h'th position as counted from left end and in the V'th position as counted from the upper end. The locations of CI(H, V), where V stands for an odd number, are not used. That is, pixel data of the Cb signals are stored in the address CJptr, (CJptr+2), . . . , (CJptr+1824), (CJptr+1826), . . . , while pixel data of the Cr signals are stored in the address (CJptr+1), (CJptr+3), . . . , CJptr+1825), (CJptr+1827), . . . .

Figure 13:
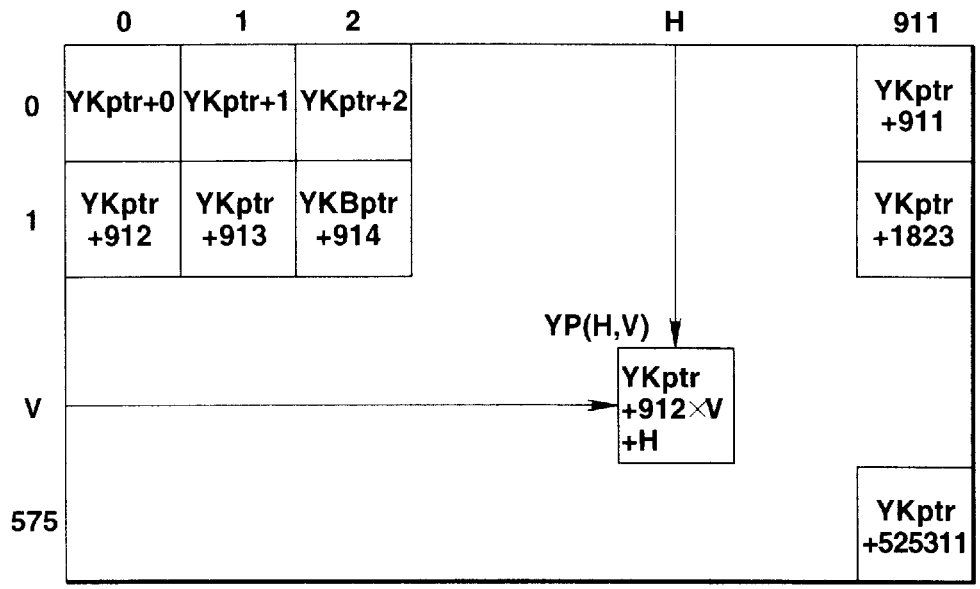
FIG. 13 shows the state in which picture data YP(H, V) of luminance signals of the P-picture are stored in the data memory.

The pixel data of the luminance signals YP(H, V) at the positions (H, V) in the P-picture are stored in the address (YKptr+912×V+H) on the data memory 12, as shown in FIG. 13. The luminance signals of each picture are made up of transverse 912 pixels by longitudinal 576 pixels. That is, the left upper end pixel of the P-picture is stored in the address YKptr, while the right lower end pixel of the P-picture is stored in the address (YKptr+525311).

Figure 14:
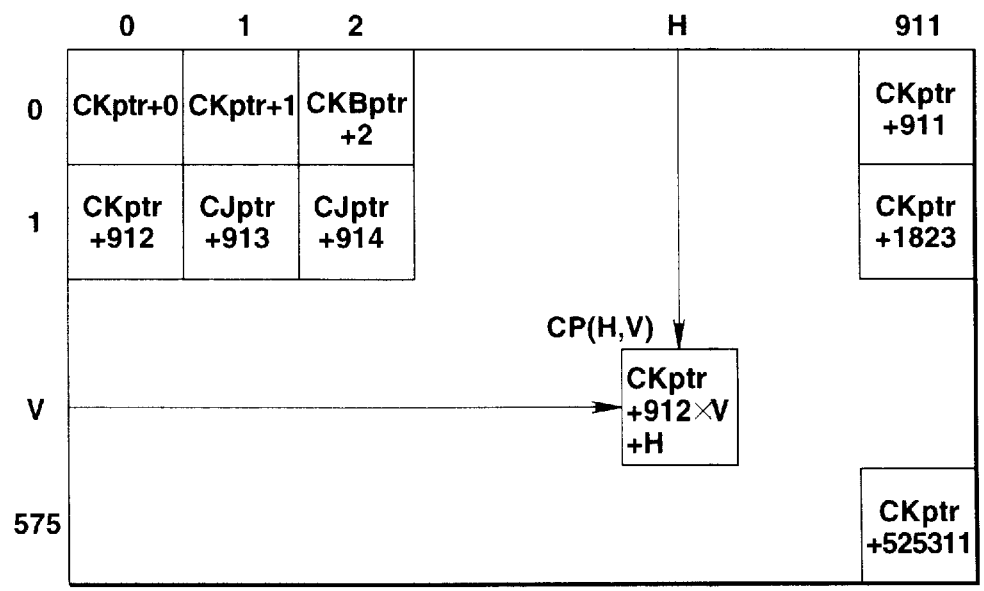
FIG. 14 shows the state in which picture data CP(H, V) of chroma signals of the P-picture are stored in the data memory.

The pixel data of the chroma signals CP(H, V) at the positions (H, V) in the P-picture are stored in the address (CKptr+912×V+H) on the data memory 12, as shown in FIG. 14. The chroma signals of each picture are made up of transverse 912 pixels by longitudinal 576 pixels. That is, the left upper end pixel of the P-picture is stored in the address CKptr, while the right lower end pixel of the P-picture is stored in the address (CKptr+525311).

In the case of the 4:2:2 format, there are two sorts of the chroma signals (Ch and Cr signals), each having transverse pixels the number of which is one-half that of the luminance signals. In this case, the pixel data CP(2×h, V) of the Cb signal are stored in the h'th position as counted from left end and in the V'th position as counted from the upper end. The pixel data CP(2×h+1, V) of the Cb signal are stored in the h'th position as counted from left end and in the V'th position as counted from the upper end.

In the case of the 4:2:0 format, there are two sorts of the chroma signals (Ch and Cr signals), each having transverse pixels the number of which is one-half that of the luminance signals and longitudinal pixels the number of which is one-half that of the luminance signals. In this case, the pixel data CP(2×h, 2×v) of the Cb signal are stored in the h'th position as counted from left end and in the v'th position as counted from the upper end. The pixel data CP(2×h+1, 2×v) of the Cb signal are stored in the V'th position as counted from left end and in the V'th position as counted from the upper end. The locations of CP(H, V), where V stands for an odd number, are not used.

Figure 15:
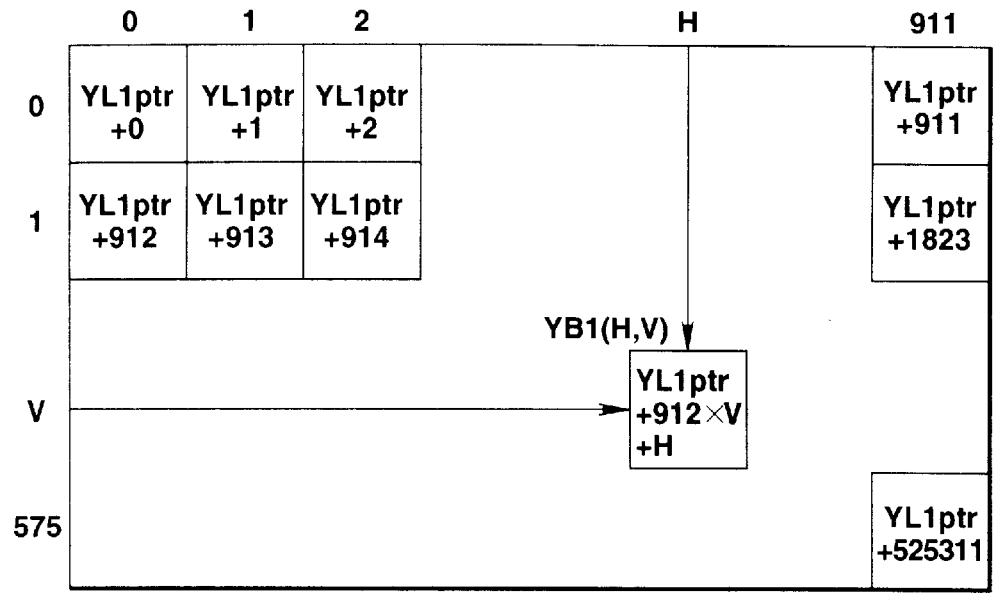
FIG. 15 shows the state in which picture data YB1(H, V) of luminance signals of the B1-picture are stored in the data memory.

The pixel data of the luminance signals YB1(H, V) at the positions (H, V) in the B1-picture are stored in the address (YL1ptr+912×V+H) on the data memory 12, as shown in FIG. 15. The luminance signals of each picture are made up of transverse 912 pixels by longitudinal 576 pixels. That is, the left upper end pixel of the B1-picture is stored in the address YL1ptr, while the right lower end pixel of the B1-picture is stored in the address (YL1ptr+525311).

Figure 16:
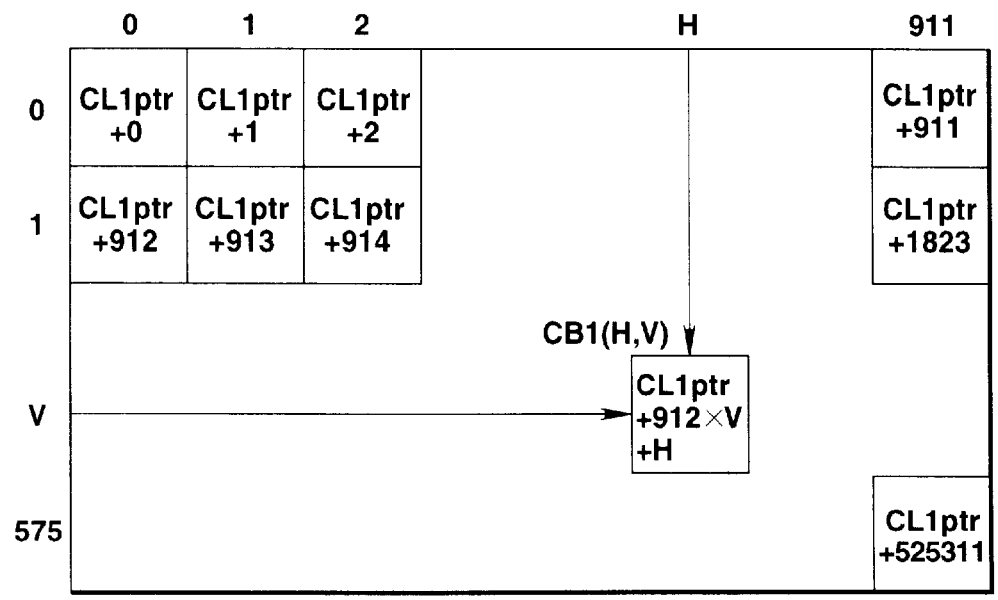
FIG. 16 shows the state in which picture data CB1(H, V) of chroma signals of the B1-picture are stored in the data memory.

The pixel data of the chroma signals CB1(H, V) at the positions (H, V) in the B1-picture are stored in the address (CL1ptr+912×V+H) on the data memory 12, as shown in FIG. 16. The chroma signals of each picture are made up of transverse 912 pixels by longitudinal 576 pixels. That is, left upper end pixel of the B1-picture is stored in the address CL1ptr, while the right lower end pixel of the B1-picture is stored in the address (CL1ptr+525311).

In the case of the 4:2:2 format, there are two sorts of the chroma signals (Cb and Cr signals), each having transverse pixels the number of which is one-half that of the luminance signals. In this case, the pixel data CB1(2×h, V) of the Cb signal are stored in the h'th position as counted from left end and in the V'th position as counted from the upper end. The pixel data CB1(2×h+1, V) of the Cr signal are stored in the h'th position as counted from left end and in the V'th position as counted from the upper end.

In the case of the 4:2:0 format, there are two sorts of the chroma signals (Cb and Cr signals), each having transverse pixels the number of which is one-half that of the luminance signals and longitudinal pixels the number of which is one-half that of the luminance signals. In this case, the pixel data CB1(2×h, 2×v) of the Cb signal are stored in the h'th position as counted from left end and in the v'th position as counted from the upper end. The pixel data CB1(2×h+1, 2×v) of the Cb signal are stored in the h'th position as counted from left end and in the v'th position as counted from the upper end. The locations of CB1(H, V), where V stands for an odd number, are not used.

Figure 17:
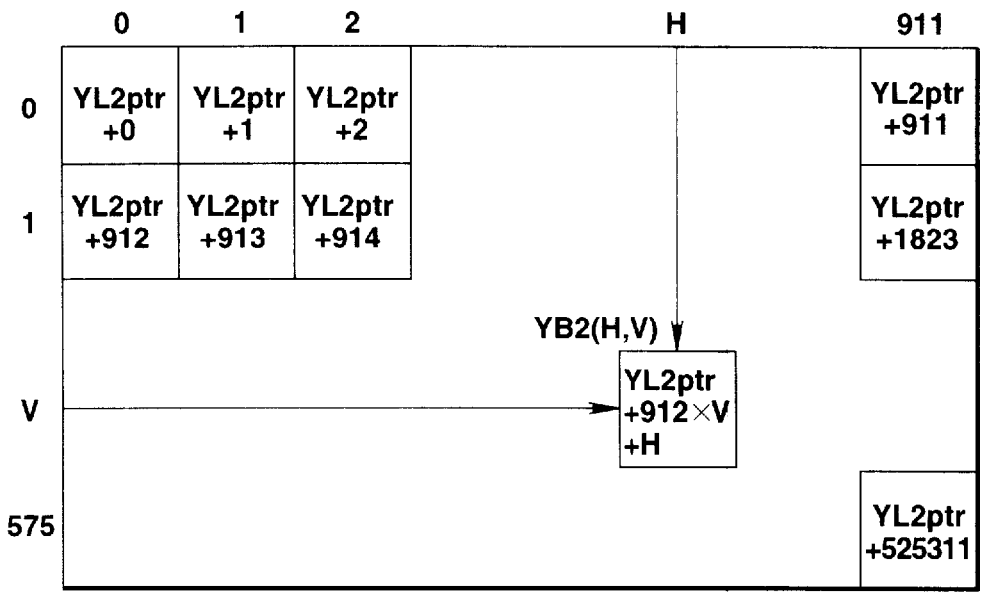
FIG. 17 shows the state in which picture data YB2(H, V) of luminance signals of the B2-picture are stored in the data memory.

The pixel data of the luminance signals YB2(H, V) at the positions (H, V) in the B2-picture are stored in the address (YL2ptr+912×V+H) on the data memory 12, as shown in FIG. 17. The luminance signals of each picture are made up of transverse 912 pixels by longitudinal 576 pixels. That is, the left upper end pixel of the B2-picture is stored in the address YL2ptr, while the right lower end pixel of the B2-picture is stored in the address (YL2ptr+525311).

Figure 18:
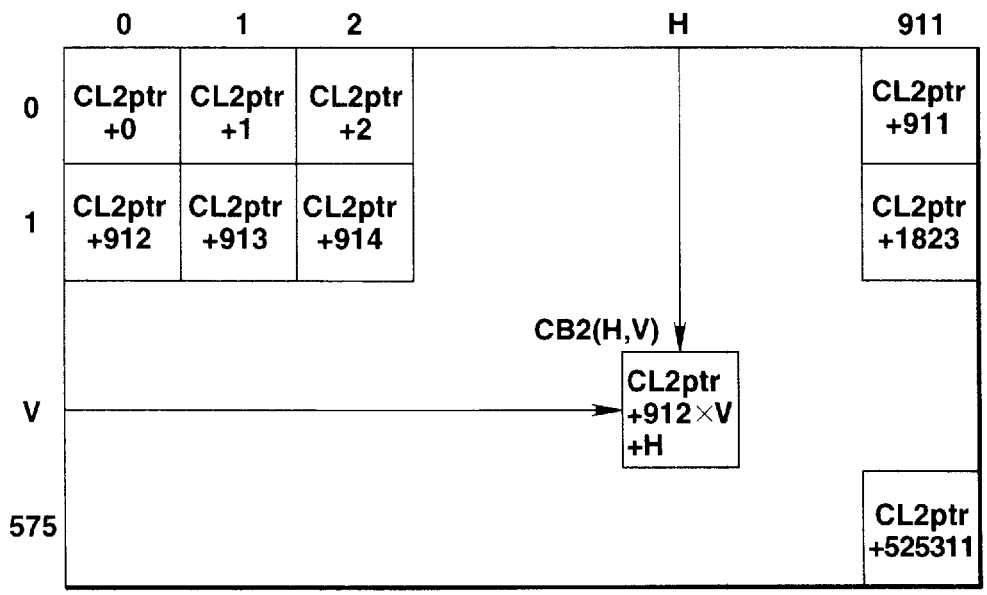
FIG. 18 shows the state in which picture data CB2(H, V) of chroma signals of the B2-picture are stored in the data memory.

The pixel data of the chroma signals CB2(H, V) at the positions (H, V) in the B2-picture are stored in the address (CL2ptr+912×V+H) on the data memory 12, as shown in FIG. 18. The chroma signals of each picture are made up of transverse 912 pixels by longitudinal 576 pixels. That is, the left upper end pixel of the B2-picture is stored in the address CL2ptr, while the right lower end pixel of the B2-picture is stored in the address (CL2ptr+525311).

In the case of the 4:2:2 format, there are two sorts of the chroma signals (Cb and Cr signals), each having transverse pixels the number of which is one-half that of the luminance signals. In this case, the pixel data CB2(2×h, V) of the Cb signal are stored in the h'th position as counted from left end and in the V'th position as counted from the upper end. The pixel data CB2(2×h+1, V) of the Cr signal are stored in the h'th position as counted from left end and in the V'th position as counted from the upper end.

In the case of the 4:2:0 format, there are two sorts of the chroma signals (Cb and Cr signals), each having transverse pixels the number of which is one-half that of the luminance signals and longitudinal pixels the number of which is one-half that of the luminance signals. In this case, the pixel data CB2(2×h, 2×v) of the Cb signal are stored in the h'th position as counted from left end and in the V'th position as counted from the upper end. The pixel data CB2(2×h+1, 2×v) of the Cr signal are stored in the h'th position as counted from left end and in the v'th position as counted from the upper end. The locations of CB2(H, V), where V stands for an odd number, are not used.

Figure 19:
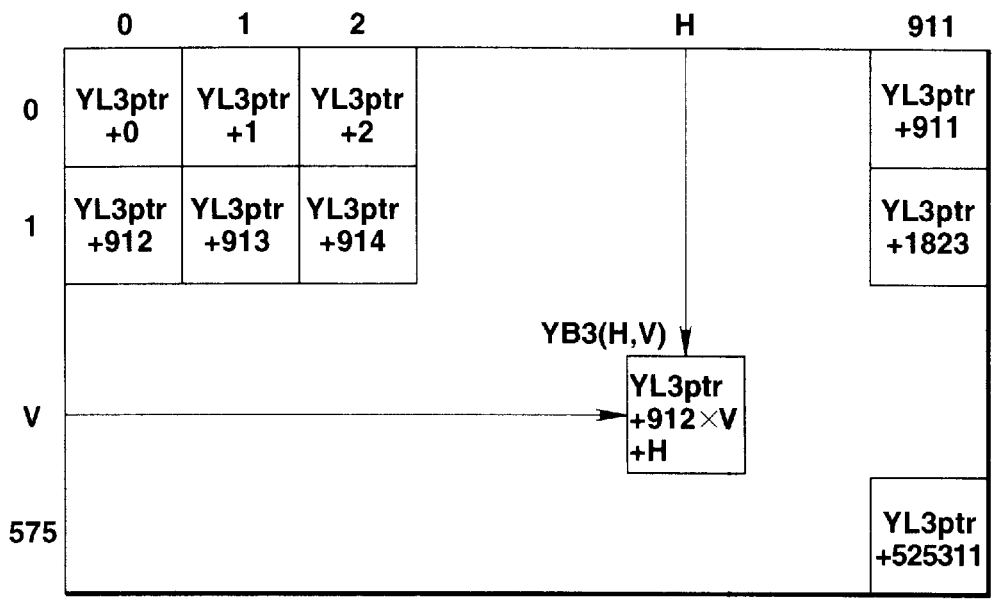
FIG. 19 shows the state in which picture data YB3(H, V) of luminance signals of the B3-picture are stored in the data memory.

The pixel data of the luminance signals YB3(H, V) at the positions (H, V) in the B3-picture are stored in the address (YL3ptr+912×V+H) on the data memory 12, as shown in FIG. 19. The luminance signals of each picture are made up of transverse 912 pixels by longitudinal 576 pixels. That is, the left upper end pixel of the B3-picture is stored in the address YL3ptr, while the right lower end pixel of the B3-picture is stored in the address (YL3ptr+525311).

Figure 20:
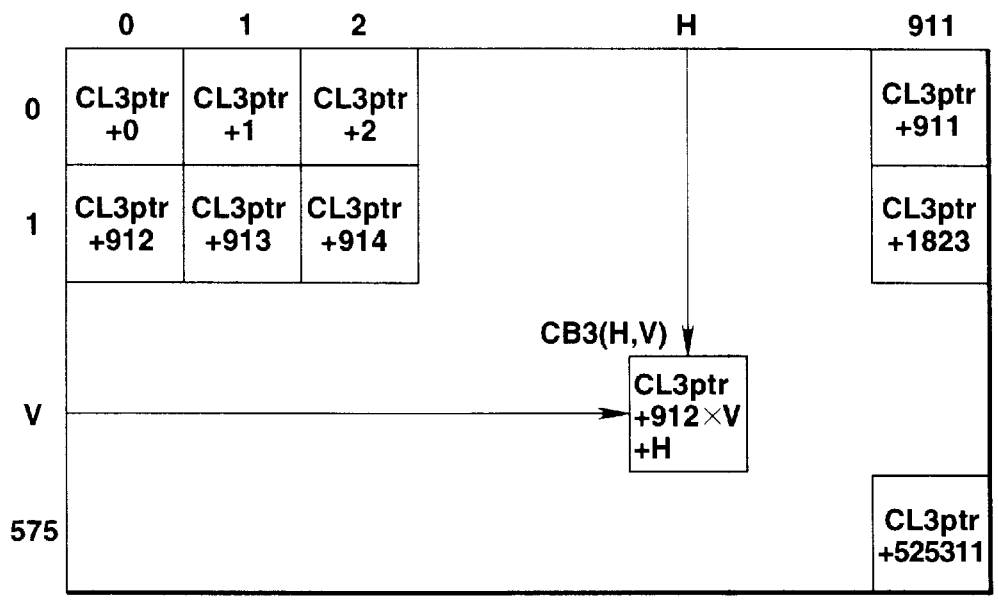
FIG. 20 shows the state in which picture data CB3(H, V) of chroma signals of the B3-picture are stored in the data memory.

The pixel data of the chroma signals CB3(H, V) at the positions (H, V) in the B3-picture are stored in the address (CL3ptr+912×V+H) on the data memory 12, as shown in FIG. 20. The chroma signals of each picture are made up of transverse 912 pixels by longitudinal 576 pixels. That is, the left upper end pixel of the B3-picture is stored in the address CL3ptr, while the right lower end pixel of the B3-picture is stored in the address (CL3ptr+525311).

In the case of the 4:2:2 format, there are two sorts of the chroma signals (Cb and Cr signals), each having transverse pixels the number of which is one-half that of the luminance signals. In this case, the pixel data CB3(2×h, V) of the Cb signal are stored in the h'th position as counted from left end and in the V'th position as counted from the upper end. The pixel data CB3(2×h+1, V) of the Cr signal are stored in the h'th position as counted from left end and in the V'th position as counted from the upper end.

In the case of the 4:2:0 format, there are two sorts of the chroma signals (Cb and Cr signals), each having transverse pixels the number of which is one-half that of the luminance signals and longitudinal pixels the number of which is one-half that of the luminance signals. In this case, the pixel data CB3(2×h, 2×v) of the Cb signal are stored in the h'th position as counted from left end and in the v'th position as counted from the upper end. The pixel data CB3(2×h+1, 2×v) of the Cb signal are stored in the h'th position as counted from left end and in the v'th position as counted from the upper end. The locations of CB3(H, V), where V stands for an odd number, are not used.

Figure 21:
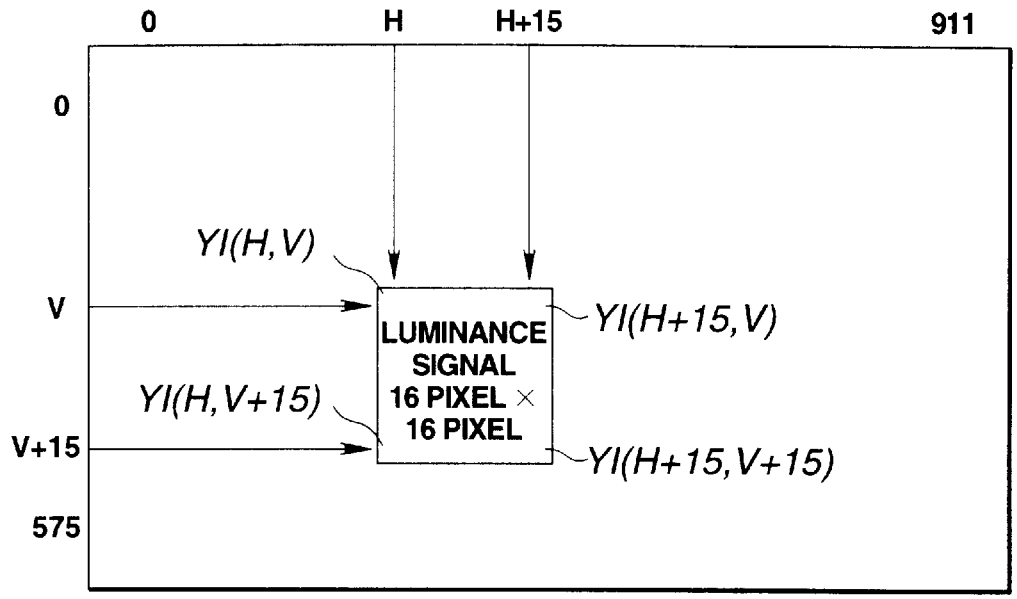
FIG. 21 shows the state in which pixel data of luminance signals of an I-picture made up of 16×16 pixels in the data memory.
Figure 22:
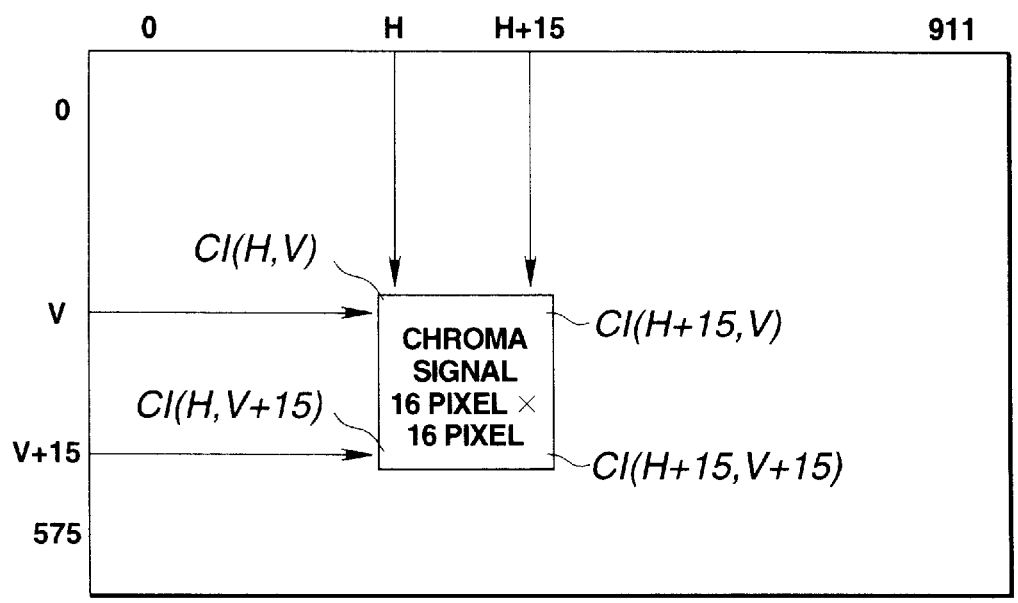
FIG. 22 shows the state in which pixel data of chroma signals of an I-picture made up of 16×16 pixels in the data memory.

In the data memory 12 of the information processing device, the picture is usually compressed on the macroblock basis. Referring to FIGS. 21 and 22, the luminance signals are grouped in terms of 16 by 16 pixel data YI(H+I, V+j)as a unit, where i, j=0, 1, . . . 15, and encoded in this form, while the chroma signals are grouped in terms of 16 by 16 pixel data CI(H+i, V+j) as a unit, where i, j=0, 1, . . . 15, and encoded in this form.

In the case of the 4:2:0 format, pixel data of 16 by 16 pixel luminance signals, pixel data of 8 by 8 pixel Cb signals and pixel data of 8 by 8 pixel Cr signals are grouped together and encoded in this form. In this case, the chroma signals are associated with CI(H+i, V+j) in which odd numbered positions are not used, 16 by 16 pixel YI(H+i, V+j) and 16 by 16 pixel CI(H+i, V+j) may be thought of as being grouped together and encoded in this form.

That is, in the above information processing device, since the pixel data of the luminance and chroma signals, encoded in terms of 16 by 16 pixels as a unit, need to be collectively dequantized and inverse DCTed, the 16×16=512 pixel data are accessed a plurality of numbers of times in a continuous series of operations. That is, the information processing device accesses an address {YJptr+912×(V+j)+(H+i)} and an address {CJptr+912×(V+j)+(H+i)} a plurality of numbers of times on end.

For example, if $$(YJptr+912 \times V+H) \bmod 8192 = 0 \tag{1}$$

YI(H, V) is copied in an address 0 of the data cache 13, while YI(H+1, V) is copied in an address {YJptr+912×(V+(H+1)}}mod8192=1 on the data cache 13. On the other hand, YI(H, V+1) is copied in an address {YJptr+912×(V+1)+H}mod8192=912. Similarly, other pixel data is copied in an address shown in FIG. 23.

Also, since (CJptr−YJptr)mod8192=48, CI(H, V) is copied in an address 48 on the data cache 13, while the CI(H+1, V) is copied in an address {CJptr+912×V+(H+1)} mod8192=49 on the data cache 13. On the other hand, CI(H, V+1) is copied in an address {CJptr+912×(V+1)+H}mod8192=960. Similarly, other pixel data is copied in an address shown in FIG. 24.

That is, in the above-described information processing device, a vacant address is provided between the address (YJptr+525311) and the address CJptr of the data memory 12 so that $$(CJptr-YJptr) \bmod 8192 = 48$$

whereby the pixel data YI(H+i, V+j) of luminance signals and pixel data CI(H+i, V+j) of chroma signals are copied in different addresses on the data cache 13. That is, with the above-described information processing device, there is no risk that a location where other data on the data cache 13 is not overwritten in accessing certain data, such that, if these 512 data are accessed a number of times, the data are not overwritten with themselves, thus assuring high-speed data processing without producing caching errors.

In this manner, the information processing device performs dequantization and inverse DCT without cache errors in order to store data of the luminance signals and data of the chroma signals in the address YJptr to the address (YJptr+525311) and in the address CJptr to the address (CJptr+525311), respectively.

For the P-picture and the B1 to B3 pictures, since vacant addresses are provided between respective addresses by $$(CKptr-YKptr) \bmod \mathbf{8192} = 48$$

$$(CL1ptr-YL1ptr) \bmod \mathbf{8192} = 48$$

$$(CL2ptr-YL2ptr) \bmod \mathbf{8192} = 48$$

$$(CL3ptr-YL3ptr) \bmod \mathbf{8192} = 48$$

it becomes possible to prevent caching errors in the information processing device.

Although the above explanation has been made for the illustrative case of $(YJptr+912\times V+H) \bmod \mathbf{8192} = 0$, caching errors may be prevented for any other case by providing a vacant address between the address (YJptr+525311) and the address CJptr of the data memory 12.

The process of the above-described information processing device decoding a P-picture is explained. It is assumed that $$(YJptr+912\times H+V) \bmod \mathbf{8192} = n \qquad (1)$$

and that pixel data YI(H, V) of luminance signals at the position (H, V) of an I-picture are copied in an address n on the data cache 13.

Figure 25:
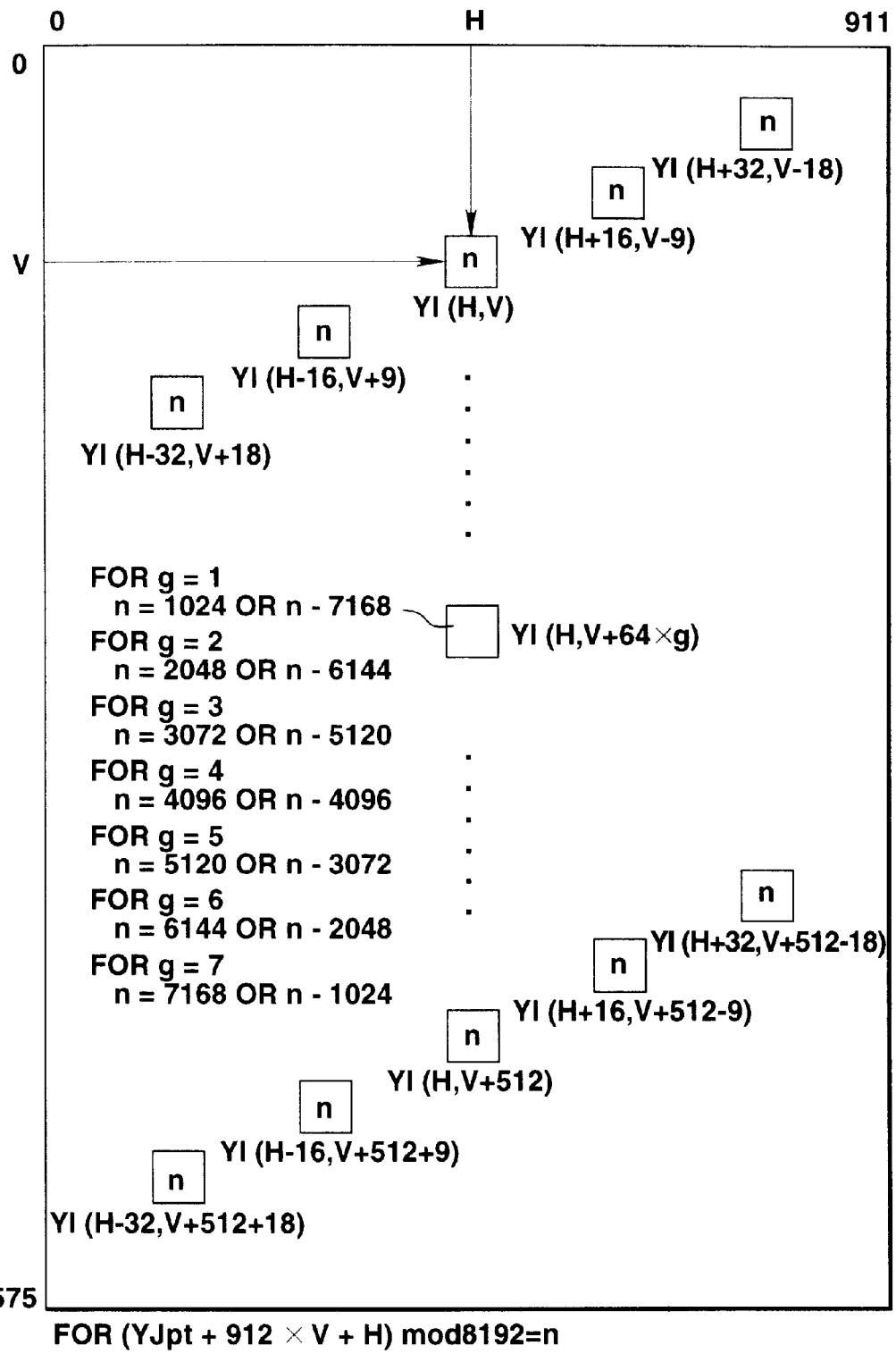
FIG. 25 shows pixel data that are stored in the data memory and that are copied in a nth address in the data cache.

In this case, YI(H, V+64) is copied in an address (n+1024) or (n−7168) on the data cache 13, as shown in FIG. 25. The reason is that, since the address of storage of YI(H, V+64) on the data memory is {YJptr+912×(V+64)+H}, the following relation:

$$\{YJptr + 912 \times (V+64) + H\} \bmod 8192$$

$$= \{YJptr + 912 \times V + H + 58368\} \bmod 8192$$

$$= \{YJptr + 912 \times V + H + 1024\} \bmod 8192$$

$$= \{n + 1024\} \bmod 8192.$$

That is, YI(H, V+64) is copied in an address (n+1024) and in an address (n−7168) for n<7168 and for ≧7168, respectively.

Similarly, YI(H, V+128) is copied in an address (n+2048) or an address (n−6144), YI(H, V+192) is copied in an address (n+3072) or an address (n−5120), YI(H, V+256) is copied in an address (n+4096) or an address (n−4096), YI(H, V+320) is copied in an address (n+5120) or an address (n−3072), and YI(H, V+384) is copied in an address (n+6144) or an address (n−2048), and YI(H, V+448) is copied in an address (n+7168) or an address (n−1024).

Moreover, pixel data YI(H−16×z, V+512×y+9×z) of the luminance signal of an I-picture at a position (H−16×z, V+512×y+9×z) is copied in an address n on the data cache 13, where y and z are integers.

That is, from the equation (2), $$\{YJptr + 912 \times (V + 512 \times y + 9 \times z) + (H - 16 \times z)\} \bmod 8192 \qquad (2)$$

$$= \{(YJptr + 912 \times V + H) + 8192 \times (57 \times y + z)\} \bmod 8192$$

$$= \{YJptr + 912 \times V + H\} \bmod 8192$$

$$= n.$$

Figure 26:
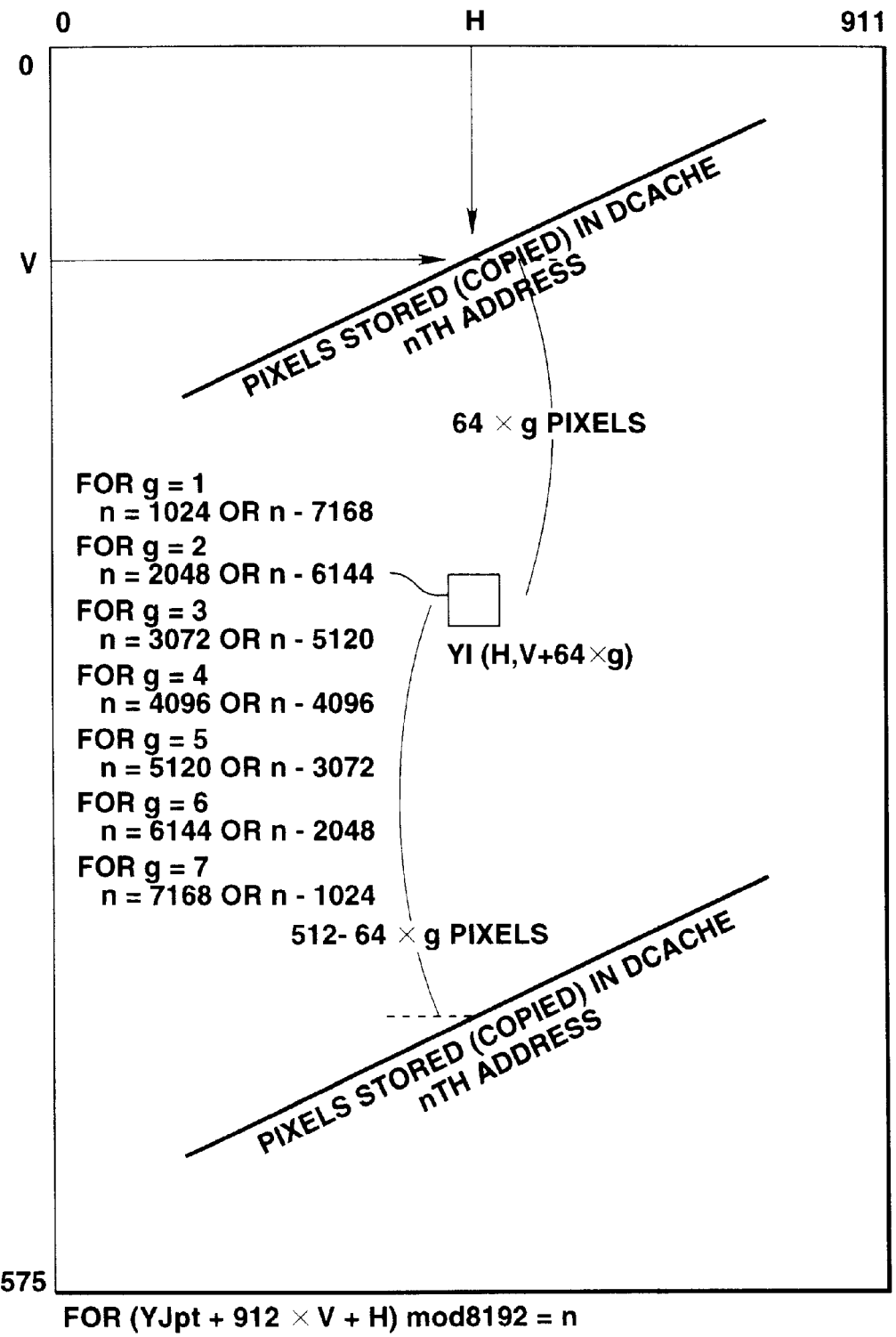
FIG. 26 shows pixel data that are stored in the data memory and that are copied in the nth address of the data cache.

If pixel data copied in the address n is represented by a thick straight line for simplification, two straight lines are produced, as shown in FIG. 26. This relation between pixels in a picture applies to other P-pictures, B1 to B3 pictures and to chroma signals.

When restoring pixel data of luminance signals at the position (H, V) of the P-picture, the information processing device adds the compressed and subsequently dequantized and inverse-DCTed data to prediction pixels read out from the I-picture for restoring the pixel data YP(H, V).

It is assumed that $$(YKptr+912\times V+H) \bmod \mathbf{8192} + 4096.$$

Figure 27:
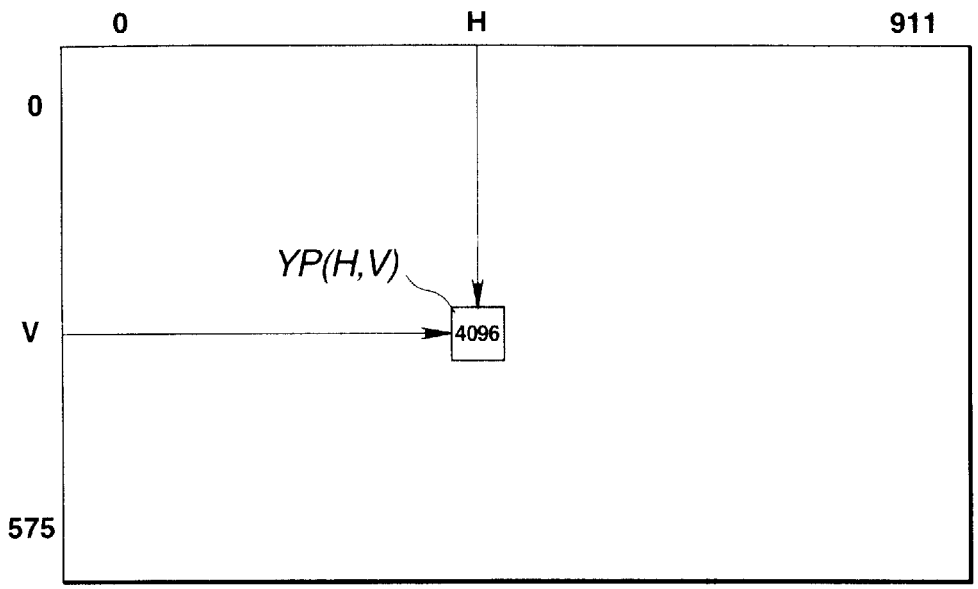
FIG. 27 shows pixel data of a P-picture stored in the data memory and that are copied in the 4096th address of the data cache.
Figure 28:
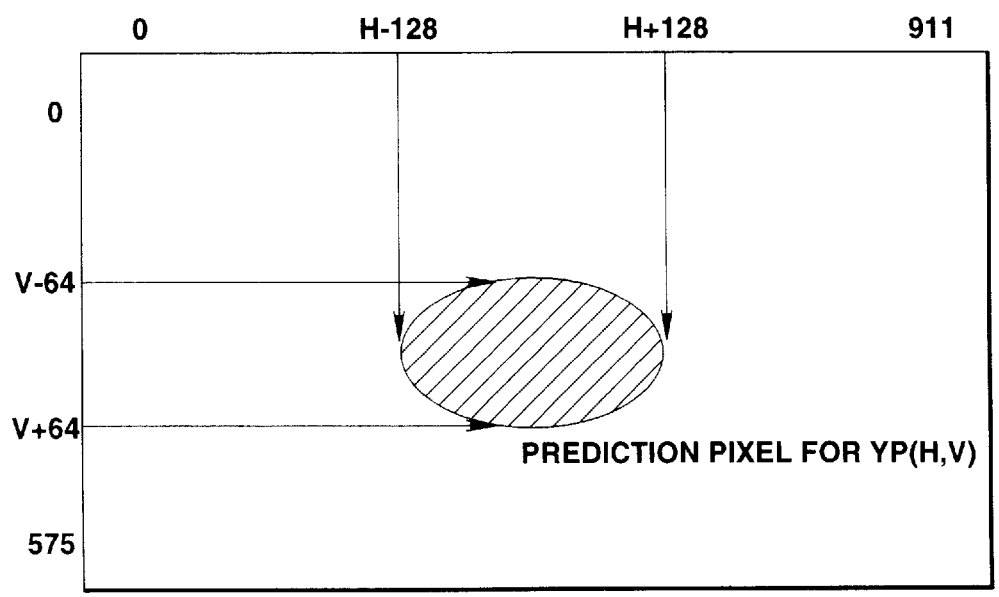
FIG. 28 shows a range of a prediction of luminance signals of the P-picture.

At this time, YP(H, V) is copied in an address 4096 on the data cache 13, as shown in FIG. 27. On the other hand, the prediction pixel of YP(H, V) for the I-picture is within (H−128~H+128, V−64~V+64) of the I-picture, as shown in FIG. 28. Meanwhile, from $$(YKptr-YJptr) \bmod \mathbf{8192} = 4096$$

the following relation:

$$(YKptr + 912 \times V + H) \bmod 8192 + 4096$$

$$= \{(YKptr - 4096) + 912 \times V + H\} \bmod 8192$$

$$= 0$$

holds. Thus, luminance signal pixel data YI(H, V) at the position (H, V) of the I-picture is copied in an address 0 on the data cache 13, as shown in FIG. 29.

Figure 29:
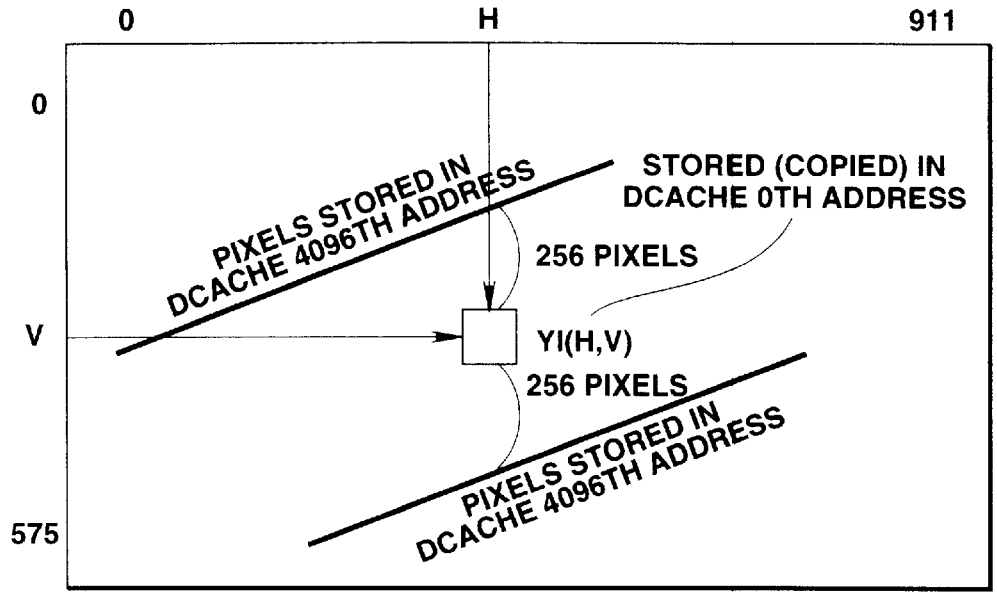
FIG. 29 shows the relation between the luminance signal of an I-picture copied in the zero'th address of the data cache.

By assuming that n=4096 in the above equation (2), a group of pixel data of luminance signals copied in the address 4096 of the data cache 13 in the I-picture is present on a thick straight line shown in FIG. 29, while the pixel data in other locations are copied in addresses other than the address 4096.

That is, the pixels in the shaded portion shown in FIG. 28 are copied in other than the address 4096 of the data cache 13. That is, the prediction pixel that is read out from the I-picture and that is required for restoring YP(H, V) copied in the address 4096 on the data cache 13 is copied in other then the address 4096 of the data cache 13. Since there is no risk of the pixel data YP(H, V) and the prediction pixel therefor overwriting each other in the same address on the data cache 13, no caching error is produced, thus enabling high-speed decoding of the P-picture.

Although the above explanation has been made with reference to an illustrative case of $(YKptr+912\times V+H) \bmod \mathbf{8192} + 4096$, the same also applies for other cases as well.

The explanation is now made on how the value of YKptr is determined after the value of YJptr is set. It the value of YJptr is set, it is determined in which address on the data cache 13 each luminance signal pixel data in the I-picture is copied.

Figure 30:
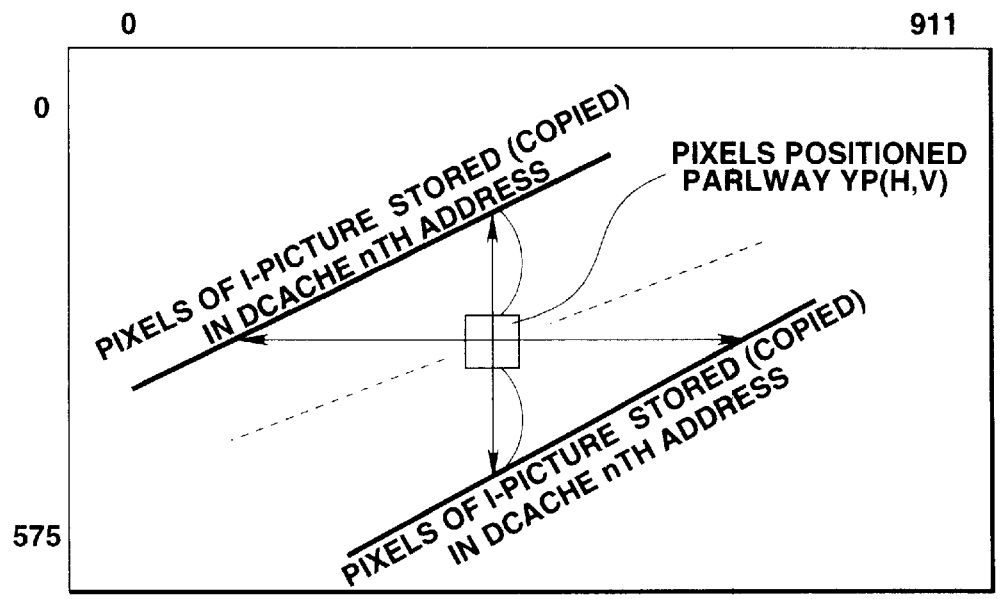
FIG. 30 shows the relation between the pixel YP(H, V) of the P-picture and a pixel of the I-picture copied in the nth address of the data cache.

It is specifically assumed that pixel data of luminance signals on plural thick lines (pixel data in the I-picture) are copied in an address n on the data cache 13, as shown in FIG. 30. A position remotest from the plural thick lines, that is a position partway between the plural thick lines, is denoted as (H, V).

Since the pixel data YP(H, V) positioned at (H, V) in the P-picture is stored in the address (YKptr+912×V+H) on the data memory, the pixel data is copied in the address (YKptr+912×V+H) on the data cache 13. Thus, by setting YKptr so that (YKptr+912×V+H)mod8192+n, no caching error is produced when having reference to a prediction picture for YP(H, V) in the P-picture, because YP(H, V) is copied in the address n on the data cache 13, while each pixel in the vicinity of (H, V) in the I-picture is copied in other than the address n.

This sets the value of YKprt. FIG. 10 shows allocation embodying the present invention. That is, $$YK\,ptr=YJptr+1060864.$$

The same applies for chroma signals. It should be noted that the data cache 13 has the capacity of 8192 words.

If the decoding process for B1 to B3 pictures as later explained is taken into account, it is advisable to use a process shown in FIG. 31.

That is, pixel data of the luminance signals in the P-picture at the positions on a broken line inclusive of YP(H, V) in FIG. 30 are copied in the address n on the data cache 13. The pixel data of the luminance signals in the I-picture at positions on a lower thick line in FIG. 30 are also copied in the address n on the data cache 13.

Of the pixel data of the luminance signals in the B1 to B3 pictures, the pixel data of the luminance signals positioned between the 'lower thick line' and the 'broken line' are denoted as YBTMP(HH, VV). For copying this YBTMP (HH, VV) in the address n on the data cache 13, the information processing device sets YL1ptr, YL2ptr and YL3ptr as will be explained subsequently. Meanwhile, since the information processing device actually processes motion compensation on the macro-block basis, it performs motion compensation processing at a time for 16 by 16 pixels centered about YBTMP. It is therefore necessary to broaden the spacing between the 'lower thick line' and the 'broken line'.

Figure 31:
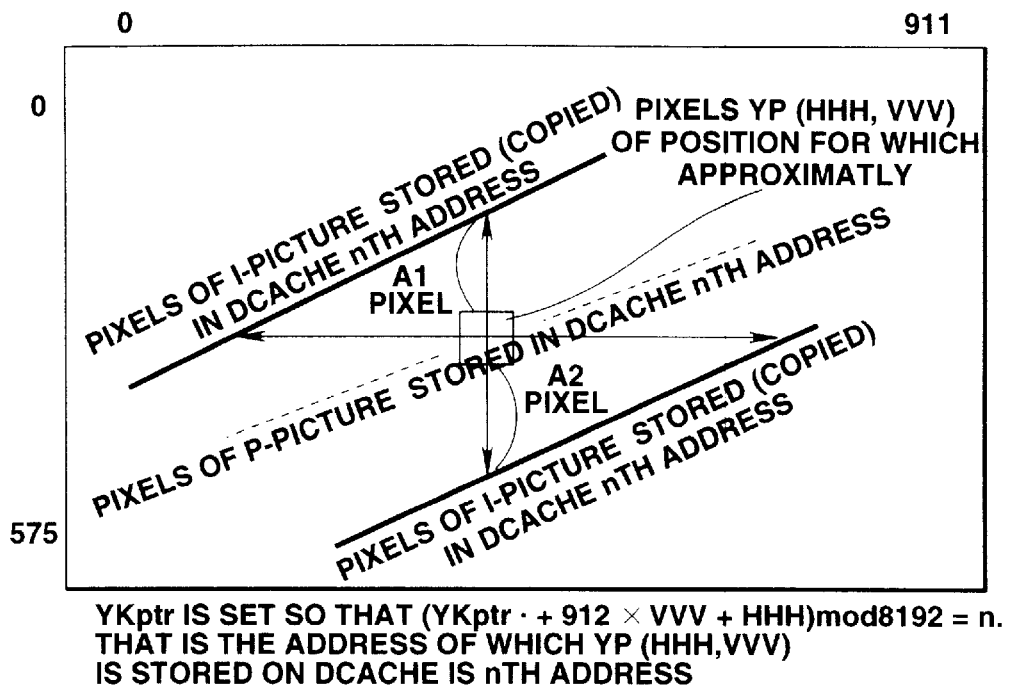
FIG. 31 shows the relation between the above pixel of the P-picture and a pixel of the I-picture copied in the nth address of the data cache.

Referring to FIG. 31, the information processing device sets YKptr so that (YKptr+912×VVV+HHH)mod8192=n, where (HHH, VVV) means a point positioned slightly closer to an upper one of two thick lines in the pixel data of the luminance signals in the I-picture that are copied in the address n on the data cache. Specifically, as shown in FIG. 31, YKptr is set so that (YKptr+912×VVV+HHH) mod8192=n, where (HHH, VVV) is a position lower by A1 from the upper thick line and higher by A2 from the lower thick line if the vertical distance between the two thick lines is denoted as A1+A2. Meanwhile, the difference (A2−A1) is on the order of 16 to 32.

By setting YK ptr in this manner, there is produced an allowance (the distance of A2 in the vertical direction) between the pixel on the lower thick line of pixel data of the luminance signals in the I-picture in FIG. 31 copied in the address n on the data cache 13 and the pixel on a chain-dotted line of pixel data of the luminance signals in the P-picture in FIG. 31 copied in the address n on the data cache. Thus the information processing device can effect motion compensation on pixel data of luminance signals in the B1 to B3 pictures on the macro-block basis.

The process of decoding the B1 to B3 pictures is now explained.

The information processing device sums the compressed and subsequently dequantized and inverse-DCTed data to an average value between a first prediction pixels read out from the I-picture and a second prediction pixels read out from the P-picture for restoring the pixel data YB1(H, V) of the luminance signals at the position (H, V) of the B1 picture.

It is assumed that $$(YL1ptr+912\times V+H)\mathrm{mod}\mathbf{8192}=1092.$$

Figure 32:
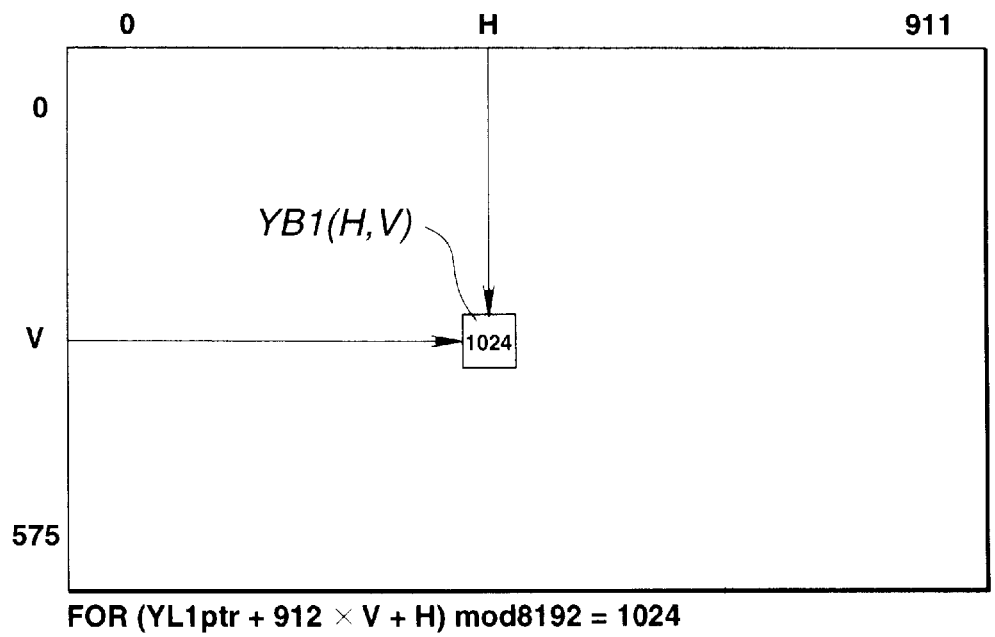
FIG. 32 shows pixel data of the B1 picture that is stored in the data memory and that is copied in the 1024th address of the data cache.
Figure 33:
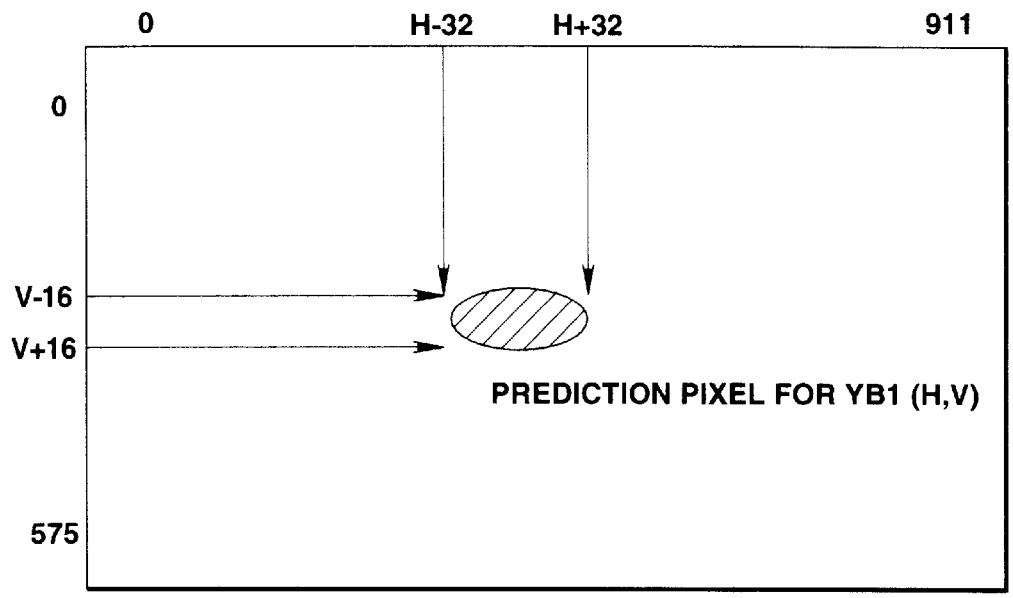
FIG. 33 shows the range of a prediction pixel of an I-picture with respect to the luminance signal of the B1 picture.
Figure 34:
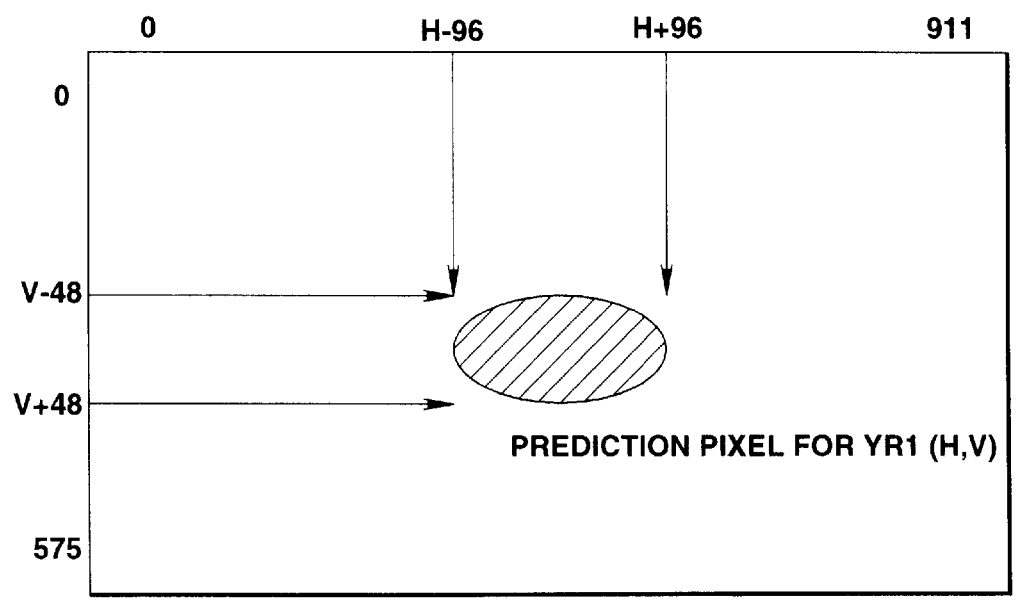
FIG. 34 shows the range of a prediction pixel of an P-picture with respect to the luminance signal of the B1 picture.

The information processing device reads out YB1(H, V) from the data memory 12 for copying in an address 1024 on the data cache 13, as shown in FIG. 32. As described above, the prediction picture for YB1(H, V) read out from the I-picture is in a range of (H−32~H+32, V−16~V+16), as shown in FIG. 33. Similarly, the prediction picture for YB1(H, V) read out from the P-picture is in a range of (H−96~H+96, V−48~V+48), as shown in FIG. 34.

Meanwhile, since (YL1ptr−YJptr)mod8192=1024, $$YJptr + 912 \times V + H)\mathrm{mod}8192$$
$$= \{(YL1ptr - 1024) + 912 \times V + H\}\mathrm{mod}8192$$
$$= 0.$$

Figure 35:
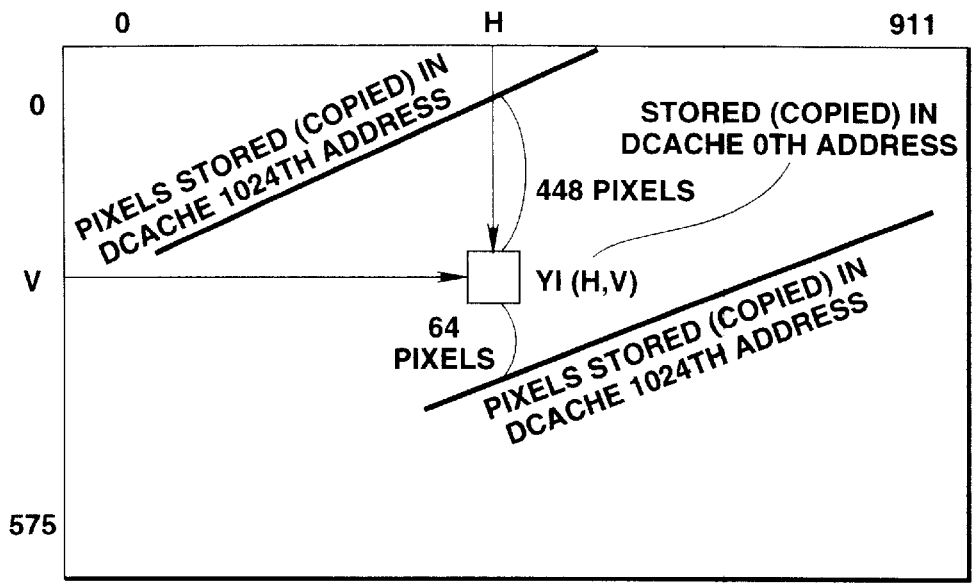
FIG. 35 shows the relation between the luminance signal of a B1 picture copied n the 1024th address of the data cache and the luminance signal of an I-picture copied in the 0th address of the data cache.

Therefore, the pixel data YI(H, V) of the luminance signal at the position (H, V) of the I-picture is copied in an address 0 on the data cache 13, as shown in FIG. 35. On the other hand, if it is assumed that n=1024 in equation (2), a set of pixel data of luminance signals copied in the address 1024 of the data cache 13 is on the thick straight line shown n FIG. 35, with the pixel data in other locations being copied in other than the address 1024.

As may be seen from FIGS. 33 and 35, the pixels shown shaded in FIG. 33 are copied in other than the address 1024 of the data cache 13. That is, the first prediction pixel that is required for restoring YB1(H, V) copied in the address 1024 in the data cache 13 and that is read from the I-picture is copied in other than the address 1024 of the data cache 13. Therefore, since there is no risk of the pixel data YB1(H, V) and the prediction pixel therefor overwriting each other in the same address on the data cache 13, no caching error is produced, so that the information processing device can perform high-seed decoding of the B1-picture.

Meanwhile, since (YKptr−YL1 ptr)mod8192=3072, $$(YKptr + 912 \times V + H)\mathrm{mod}8192$$
$$= \{(YL1ptr + 3072) + 912 \times V + H\}\mathrm{mod}8192$$
$$= 4096.$$

Figure 36:
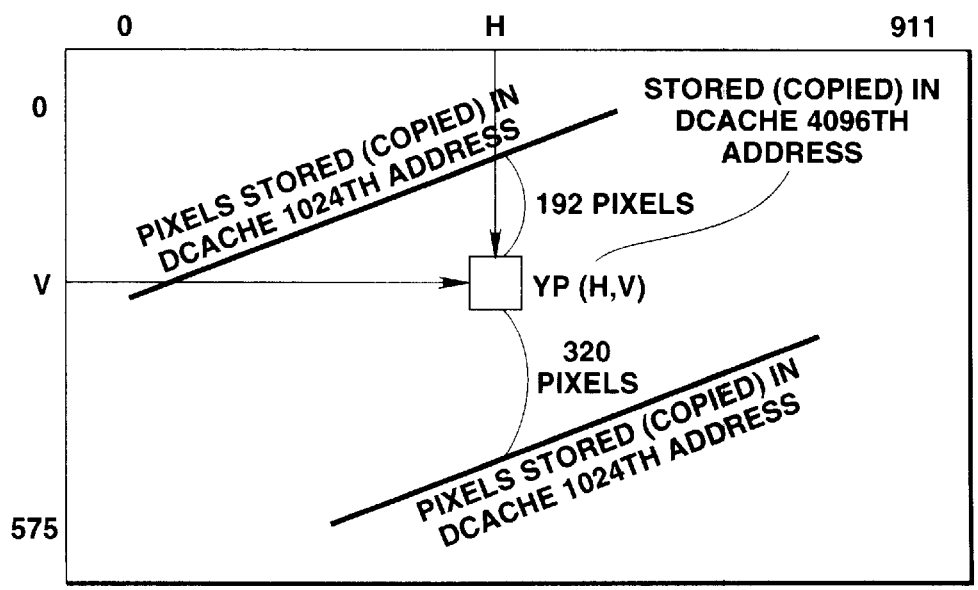
FIG. 36 shows the relation between the luminance signal of a B1 picture copied in the 1024th address of the data cache and the luminance signal of a P-picture copied in the 4096th address of the data cache.

Therefore, the luminance signal pixel data YP(H, V) at the position (H, V) of the P-picture is copied in an address 4096 on the data cache 13, as shown in FIG. 36. The set of pixel data of luminance signals in the P-picture copied in the address 1024 of the data cache 13 is on the thick straight line shown in FIG. 36, with the pixel data in other locations being copied in other than the address 1024.

As may be seen from FIGS. 34 and 36, the pixels shown shaded in FIG. 34 are copied in other than the address 1024 of the data cache 13. That is, the second prediction pixel that is required for restoring YB1(H, V) copied in the address 1024 in the data cache 13 and that is read from the P-picture is copied in other than the address 1024 of the data cache 13. Therefore, since there is no risk of the pixel data YB1(H, V) and the second prediction pixel therefor overwriting each other in the same address on the data cache 13, no caching error is produced, so that the information processing device can perform high-seed decoding of the B1-picture.

Although the above explanation has been made with reference to an illustrative case of (YL1ptr+912×V+H)mod8192+1024, the same also applies for other cases.

On the other hand, YL1ptr is set as now described.

YJptr and YKptr are pre-determined and are related to each other as shown in FIG. 30. The pixel data of the luminance signal in the P-picture at the position on a broken line in FIG. 29 are copied in an address n in the data cache 13. The pixel data of the luminance signal in the I-picture at the position on a lower thick line in FIG. 30 are copied in an address n in the data cache 13. YL1ptr is set so that, of the pixel data of the luminance signals in the B1 picture, the pixel data of the luminance signals positioned between the 'lower side thick line' and 'the dotted line' and closer to the 'lower side thick line' will be copied in the address n of the data cache 13. The position and appellation of the pixel data of the luminance signals positioned between the 'lower side thick line' and 'the dotted line' and closer to the 'lower side thick line' are (HH, VV) and YL1ptr, respectively. Thus the thick lines and the broken line in FIG. 30 are spaced to some extent and significantly from the position (HH, VV) which is the position of the data YBTMP copied in the address n on the data cache 13, respectively. If the thick lines of FIG. 30 are spaced apart to some extent from (HH, VV), no caching error is produced, because the motion vector relative to the I-picture is small. Since the broken line of FIG. 30 is spaced apart sufficiently from (HH, VV), no caching error is produced, even although the motion vector relative to the P-picture is larger. For example, YL1ptr=YJptr+2122752. The same holds for chroma signals. The data cache 13 has the capacity of 8192 words.

The decoding process for the B2-picture is now explained.

The information processing device sums the compressed and subsequently dequantized and inverse-DCTed data to an average value between a first prediction pixel read out from the I-picture and a second prediction pixel read out from the P-picture for restoring the pixel data YB2(H, V) of the luminance signals at the position (H, V) of the B2 picture.

It is assumed that $$YL2ptr+912\times V+H) \bmod 8192 = 2048.$$

Figure 37:
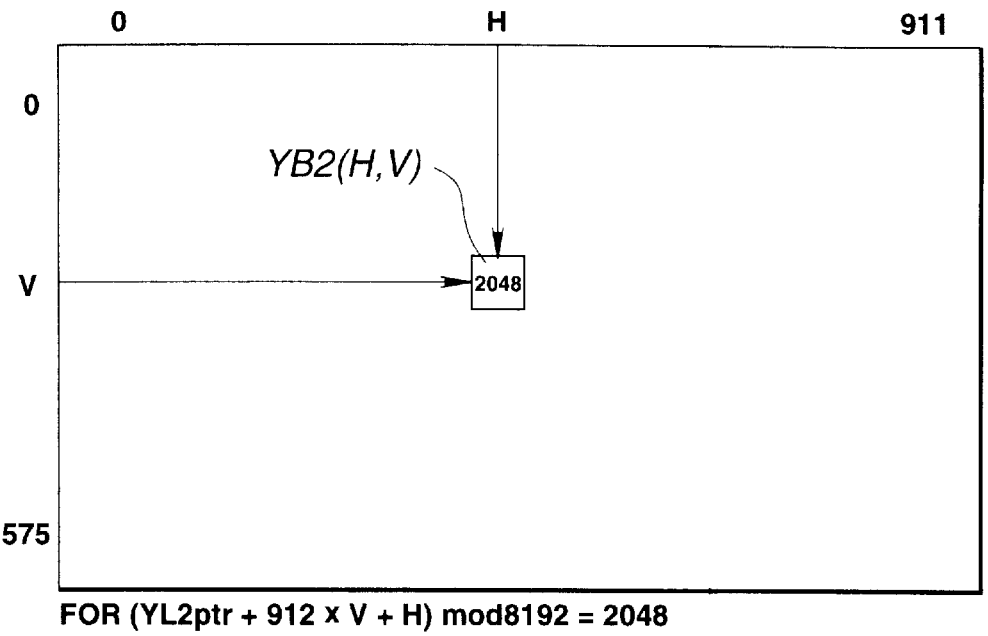
FIG. 37 shows pixel data of the B2 picture that is stored in the data memory and that is copied in the 2048th address of the data cache.
Figure 38:
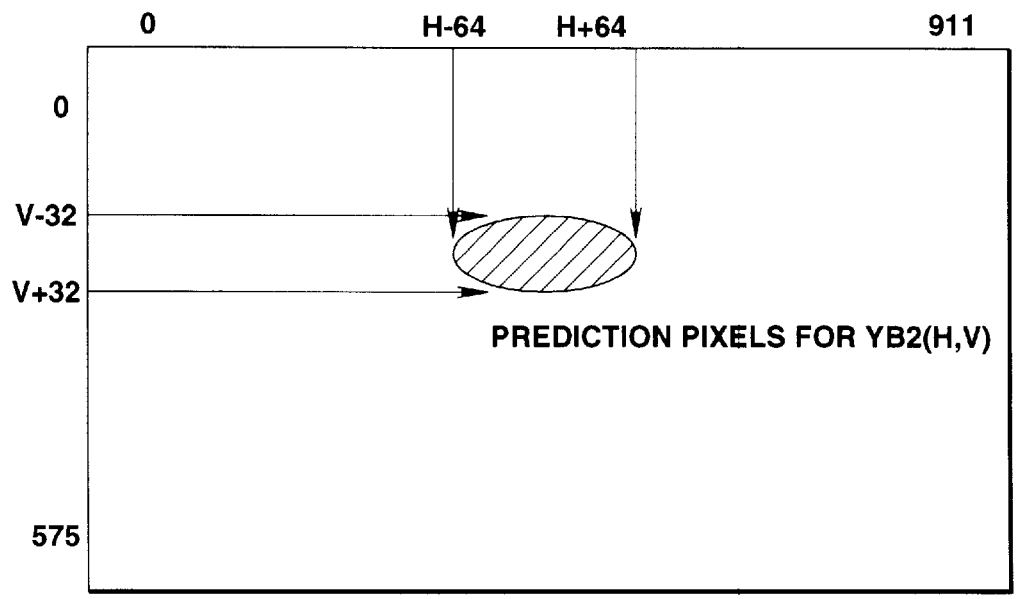
FIG. 38 shows the range of a prediction pixel of an I-picture with respect to the luminance signal of the B2 picture.
Figure 39:
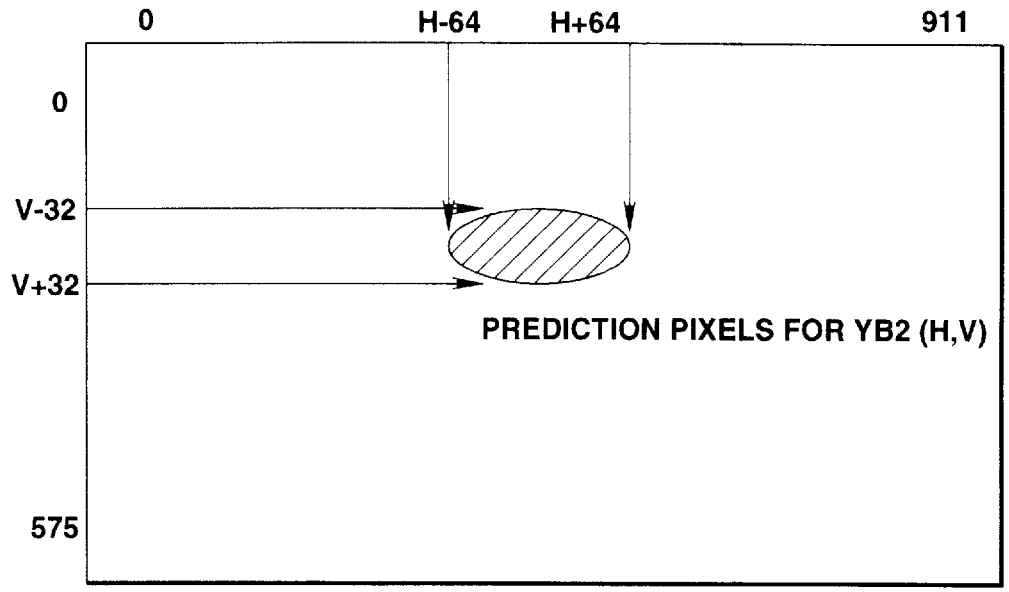
FIG. 39 shows the range of a prediction pixel of a P-picture with respect to the luminance signal of the B2 picture.

The information processing device reads out YB2(H, V) from the data memory 12 for copying in an address 2048 on the data cache 13, as shown in FIG. 37. As described above, the prediction picture for YB2(H, V) read out from the I-picture is in a range of (H−64~H+64, V−32~V+32), as shown in FIG. 38. Similarly, the prediction picture for YB2(H, V) read out from the P-picture is in a range of (H−64~H+64, V−32~V+32), as shown in FIG. 39.

Meanwhile, since (YL2ptr−YJptr)mod8192=2048, $$YJptr + 912 \times V + H) \bmod 8192$$
$$= \{(YL2ptr - 2048) + 912 \times V + H\} \bmod 8192$$
$$= 0.$$

Figure 40:
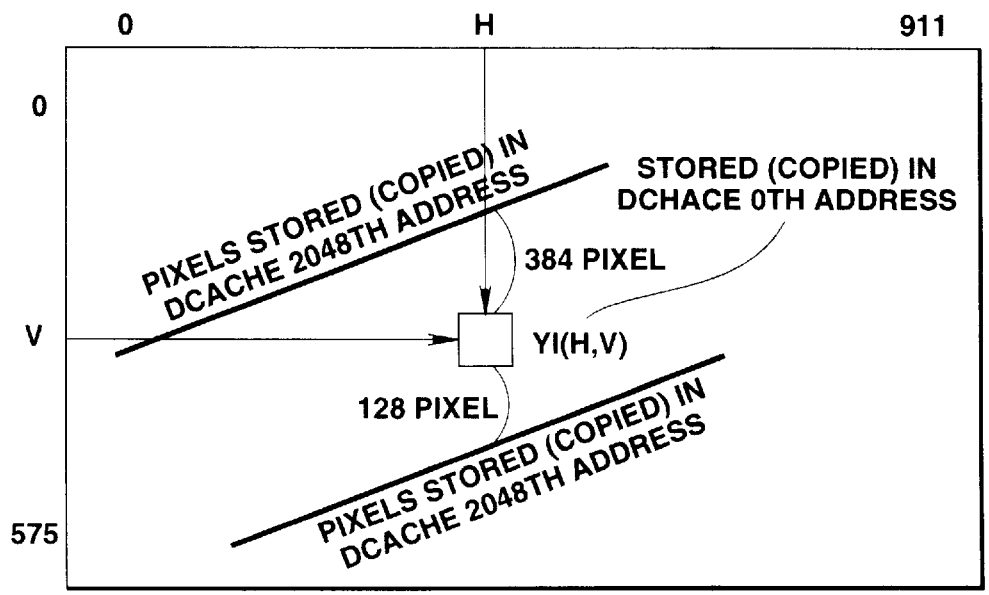
FIG. 40 shows the relation between the luminance signal of an I-picture copied in the 2048th address of the data cache and the luminance signal of an I-picture copied in the 0th address of the data cache.

Therefore, the pixel data YI(H, V) of the luminance signal at the position (H, V) of the I-picture is copied in an address 0 on the data cache 13, as shown in FIG. 40. On the other hand, if it is assumed that n=2048 in equation (2), a set of pixel data of luminance signals copied in the address 2048 of the data cache 13 is on the thick straight line shown in FIG. 40, with the pixel data in other locations being copied in other than the address 2048.

As may be seen from FIGS. 38 and 40, the pixels shown shaded in FIG. 38 are copied in other than the address 2048 of the data cache 13. That is, the first prediction pixel that is required for restoring YB2(H, V) copied in the address 2048 in the data cache 13 and that is read from the I-picture is copied in other than the address 2048 of the data cache 13. Therefore, since there is no risk of the pixel data YB2(H, V) and the prediction pixel therefor overwriting each other in the same address on the data cache 13, no caching error is produced, so that the information processing device can perform high-seed decoding of the B2-picture.

Meanwhile, since (YKptr−YL2ptr)mod8192=2048, $$YKptr + 912 \times V + H) \bmod 8192$$
$$= \{(YL2ptr + 2048) + 912 \times V + H\} \bmod 8192$$
$$= 4096.$$

Figure 41:
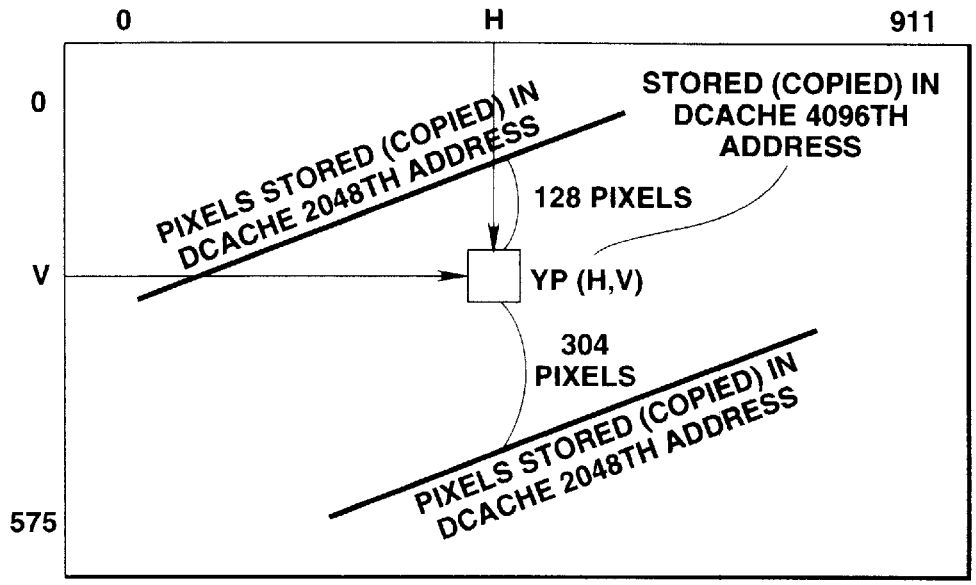
FIG. 41 shows the relation between the luminance signal of a P-picture copied in the 2048th address of the data cache and the luminance signal of a P-picture copied in the 4096th address of the data cache.

Therefore, the luminance signal pixel data YP(H, V) at the position (H, V) of the P-picture is copied in an address 4096 on the data cache 13, as shown in FIG. 41. The set of pixel data of luminance signals copied in the address 2048 of the data cache 13 is on the thick straight line shown in FIG. 41, with the pixel data in other locations being copied in other than the address 2048.

As may be seen from FIGS. 39 and 41, the pixels shown shaded in FIG. 39 are copied in other than the address 2048 of the data cache 13. That is, the second prediction pixel that is required for restoring YB2(H, V) copied in the address 2048 in the data cache 13 and that is read from the P-picture is copied in other than the address 2048 of the data cache 13. Therefore, since there is no risk of the pixel data YB2(H, V) and the second prediction pixel therefor overwriting each other in the same address on the data cache 13, no caching error is produced, so that the information processing device can perform high-seed decoding of the B2-picture.

Although the above explanation has been made with reference to an illustrative case of (YL2ptr+912×V+H)mod8192+2048, the same also applies for other cases.

On the other hand, YL2ptr is set as now described.

YJptr and YKptr are pre-determined and are related to each other as shown in FIG. 30. The pixel data of the luminance signal in the P-picture at the position on a broken line in FIG. 30 are copied in an address n in the data cache 13. The pixel data of the luminance signal in the I-picture at the position on a lower thick line in FIG. 30 are copied in an address n in the data cache 13. YL2ptr is set so that, of the pixel data of the luminance signals in the B2 picture, the pixel data of the luminance signals positioned between the 'lower side thick line' and 'the dotted line' will be copied in the address n of the data cache 13. Thus the thick lines and the broken line in FIG. 30 are spaced from the position (HH, VV) which is the position of the 'data YBTMP' copied in the address n on the data cache 13. Thus, no caching error is produced when reading out the prediction pixel for the I- or P-picture. For example, YL1ptr=YJptr+2123776. The same holds for chroma signals. The data cache 13 has the capacity of 8192 words.

The decoding process for the B3-picture is now explained.

The information processing device sums the compressed and subsequently dequantized and inverse-DCTed data to an average value between a first prediction pixel read out from the I-picture and a second prediction pixel read out from the P-picture for restoring the pixel data YB3(H, V) of the luminance signals at the position (H, V) of the B3 picture.

It is assumed that $$(YL3ptr+912\times V+H) \bmod 8192 = 3072.$$

Figure 42:
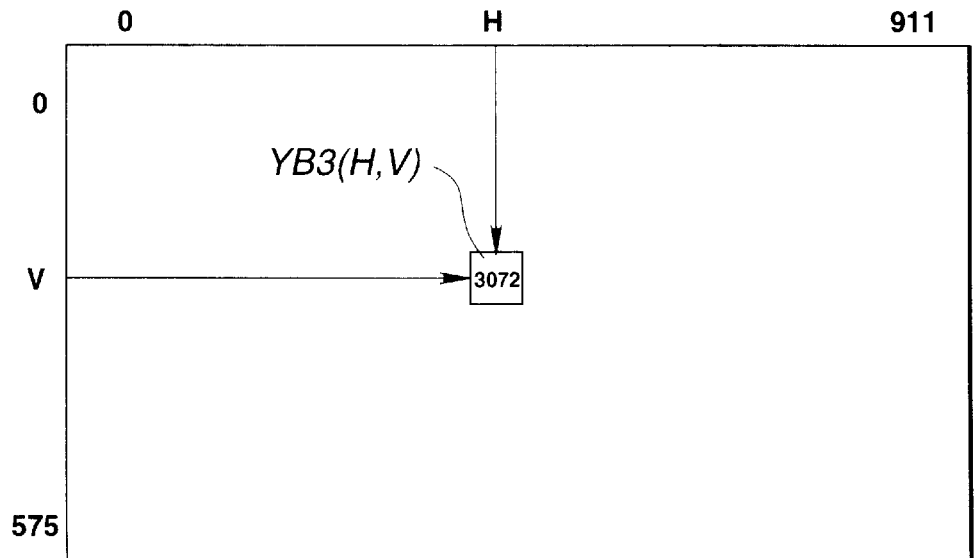
FIG. 42 shows pixel data of the B3 picture that is stored in the data memory and that is copied in the 3072nd address of the data cache.
Figure 43:
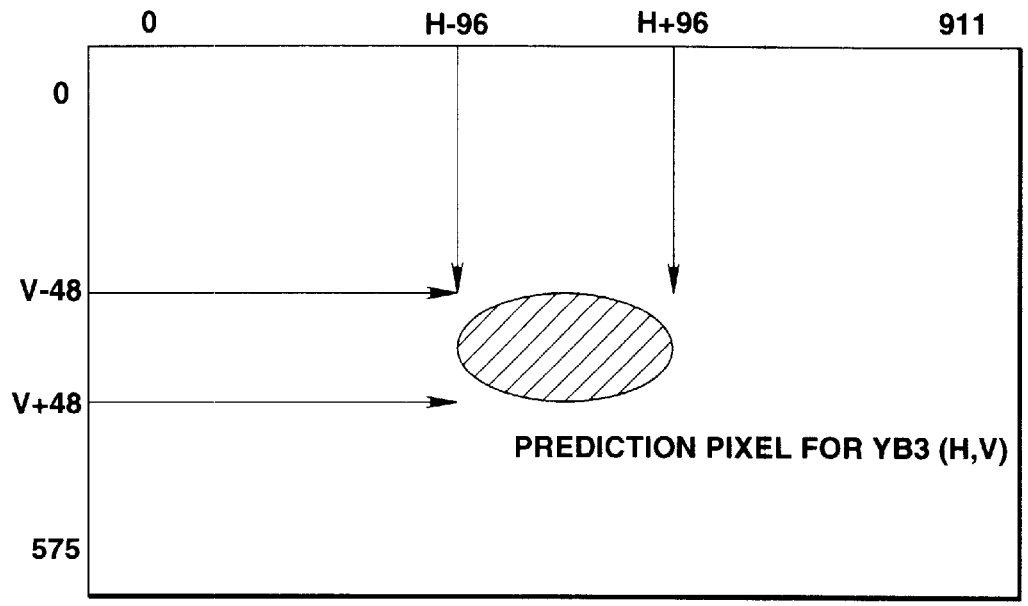
FIG. 43 shows the range of a prediction pixel of an I-picture with respect to the luminance signal of the B3 picture.
Figure 44:
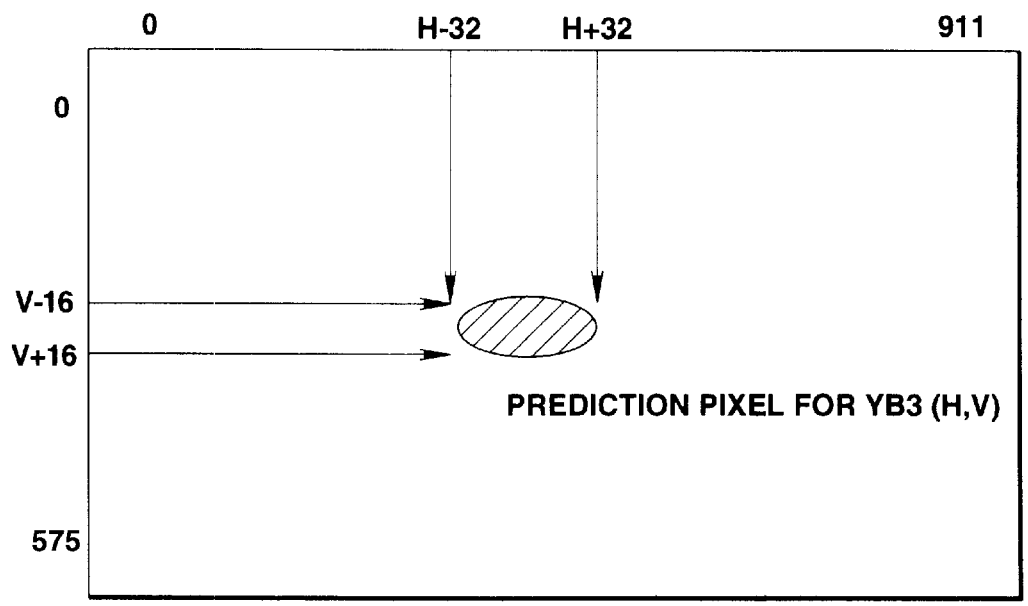
FIG. 44 shows the range of a prediction pixel of a P-picture with respect to the luminance signal of the B3 picture.

The information processing device reads out YB(H, V) from the data memory 12 for copying in an address 3072 on the data cache 13, as shown in FIG. 42. As described above, the prediction picture for YB3(H, V) read out from the I-picture is in a range of (H–96~H+96, V–48~V+48), as shown in FIG. 43. Similarly, the prediction picture for YB3(H, V) read out from the P-picture is in a range of (H–32~H+32, V–16~V+16), as shown in FIG. 44.

Meanwhile, since (YL3ptr–YJptr)mod8192=3072, $$(YJptr + 912 \times V + H) \bmod 8192$$
$$= \{(YL3ptr - 3072) + 912 \times V + H\} \bmod 8192$$
$$= 0.$$

Figure 45:
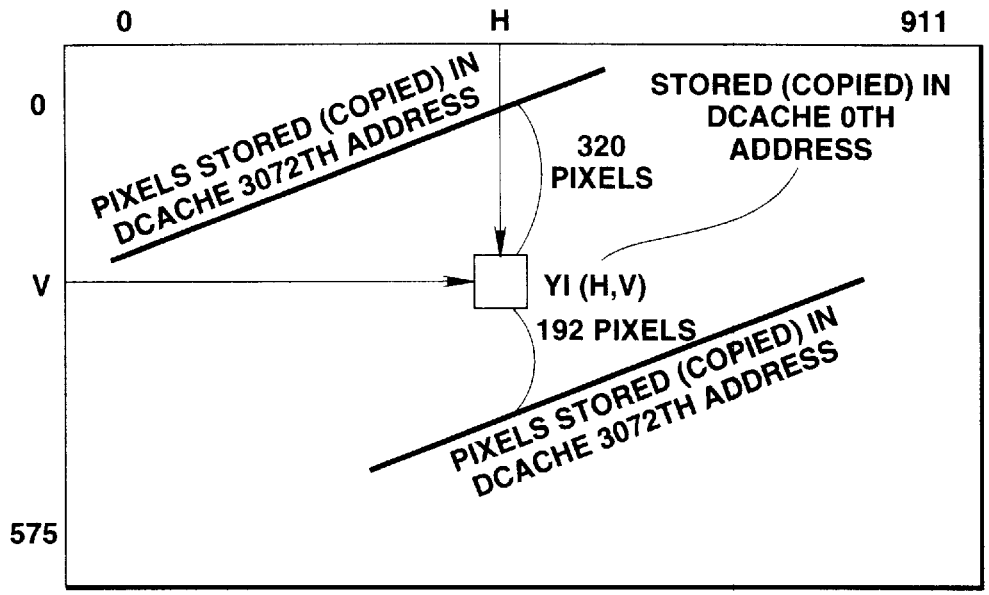
FIG. 45 shows the relation between the luminance signal of a B3-picture copied in the 3072nd address of the data cache and the luminance signal of an I-picture copied in the 0th address of the data cache.

Therefore, the pixel data YI(H, V) of the luminance signal at the position (H, V) of the I-picture is copied in an address 0 on the data cache 13, as shown in FIG. 45. On the other hand, if it is assumed that n=3072 in equation (2), a set of pixel data of luminance signals copied in the address 3072 of the data cache 13 is on the thick straight line shown in FIG. 45, with the pixel data in other locations being copied in other than the address 3072.

As may be seen from FIGS. 43 and 45, the pixels shown shaded in FIG. 43 are copied in other than the address 3072 of the data cache 13. That is, the first prediction pixel that is required for restoring YB3(H, V) copied in the address 3072 in the data cache 13 and that is read from the I-picture is copied in other than the address 3072 of the data cache 13. Therefore, since there is no risk of the pixel data YB3(H, V) and the prediction pixel therefor overwriting each other in the same address on the data cache 13, no caching error is produced, so that the information processing device can perform high-speed decoding of the B3-picture.

Meanwhile, since (YKptr–YL3ptr)mod8192=1024, $$(YKptr + 912 \times V + H) \bmod 8192$$
$$= \{(YL3ptr + 2048) + 912 \times V + H\} \bmod 8192$$
$$= 4096.$$

Figure 46:
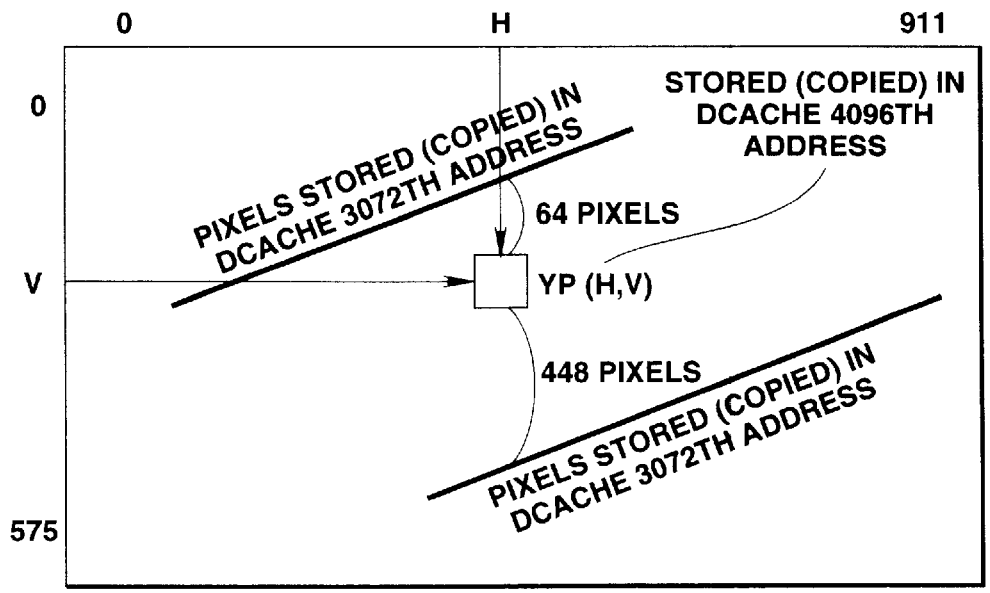
FIG. 46 shows the relation between the luminance signal of a B3-picture copied in the 3072nd address of the data cache and the luminance signal of a P-picture copied in the 4096th address of the data cache.

Therefore, the luminance signal pixel data YP(H, V) at the position (H, V) of the P-picture is copied in an address 4096 on the data cache 13, as shown in FIG. 46. The set of pixel data of luminance signals copied in the address 3072 of the data cache 13 is on the thick straight line shown in FIG. 46, with the pixel data in other locations being copied in other than the address 3072.

As may be seen from FIGS. 44 and 46, the pixels shown shaded in FIG. 44 are copied in other than the address 3072 of the data cache 13. That is, the second prediction pixel that is required for restoring YB3(H, V) copied in the address 3072 in the data cache 13 and that is read from the P-picture is copied in other than the address 3072 of the data cache 13. Therefore, since there is no risk of the pixel data YB3(H, V) and the second prediction pixel therefor overwriting each other in the same address on the data cache 13, no caching error is produced, so that the information processing device can perform high-speed decoding of the B3-picture.

Although the above explanation has been made with reference to an illustrative case of (YL3ptr+912×V+H)mod8192=3072, the same also applies for other cases as well.

On the other hand, YL3ptr is set as now described.

Figure 24:
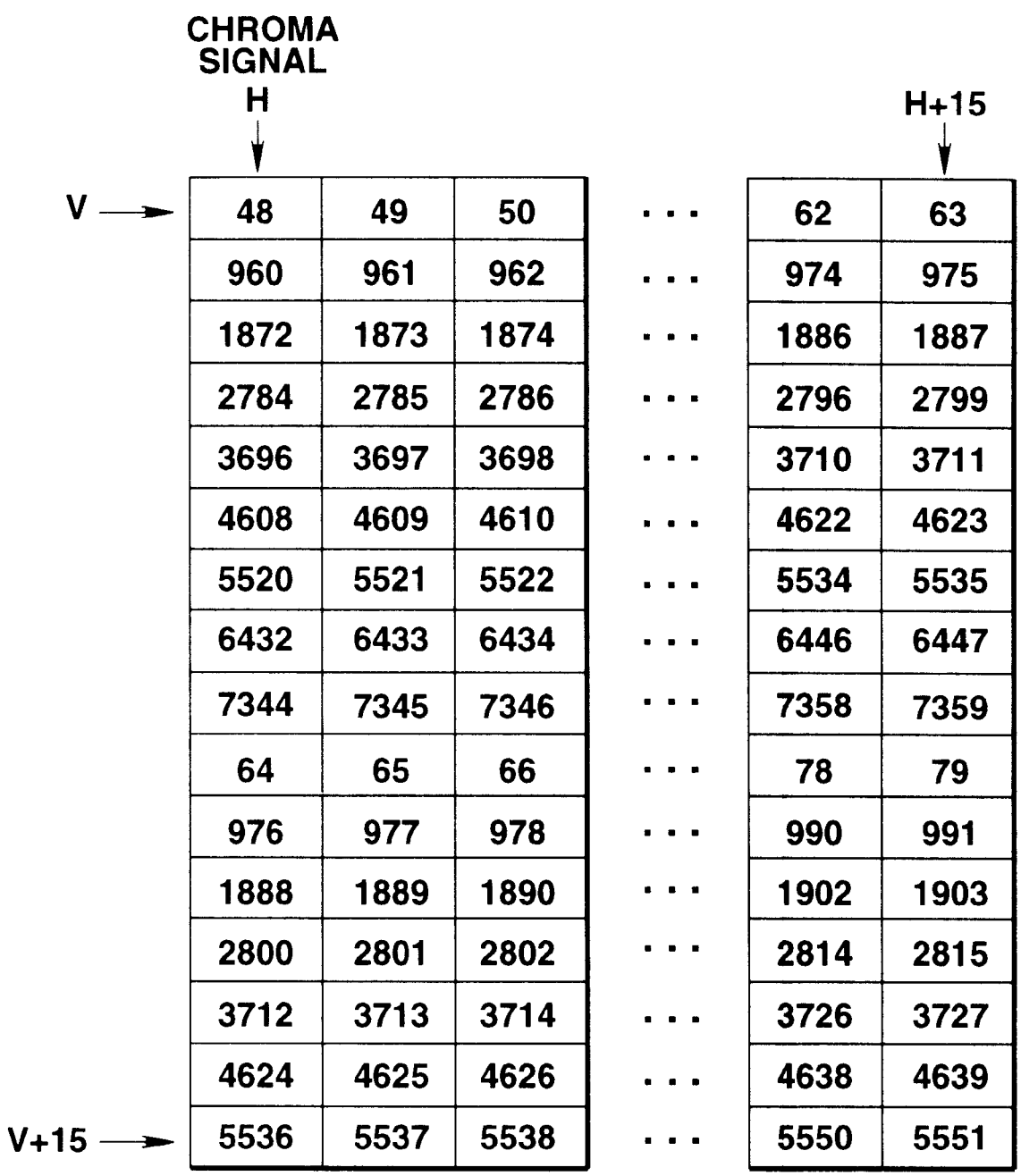
FIG. 24 shows the state in which chroma signals have been copied from the data memory to the cache memory.

YJptr and YKptr are pre-determined and are related to each other as shown in FIG. 30. The pixel data of the luminance signal in the P-picture at the position on a broken line in FIG. 30 are copied in an address n in the data cache 13. The pixel data of the luminance signal in the I-picture at the position on a lower thick line in FIG. 30 are copied in an address n in the data cache 13. YL3ptr is set so that, of the pixel data of the luminance signals in the B3 picture, the pixel data of the luminance signals positioned between the 'lower side thick line' and 'the dotted line' and closer to the 'lower side thick line' will be copied in the address n of the data cache 13. The position and appellation of the pixel data of the luminance signals positioned between the 'lower side thick line' and 'the dotted line' and closer to the 'lower side thick line' are (HH, VV) and YBTMP, respectively. Thus the thick lines and the broken line in FIG. 29 are spaced to some extent and significantly from the position (HH, VV) which is the position of the 'data YBTMP copied in the address n on the data cache 13, respectively. If the broken line of FIG. 30 is spaced apart to some extent from (HH, VV), no caching error is produced, because the motion vector relative to the P-picture is small. Since the thick line of FIG. 24 is spaced apart sufficiently from (HH, VV), no caching error is produced, even although the motion vector relative to the P-picture is larger. For example, YL3ptr=YJptr+2122752. The same holds for chroma signals. The data cache 13 has the capacity of 8192 words.

At a time point of the end of decoding of the P-picture, pixel data of the I-picture are read out from the addresses YJptr to (YJptr+525311) and from the addresses CJptr to (CJptr+525311) so as to be outputted to a picture display device, not shown.

At a time point of end of decoding of the P- or I-picture, next following the B3 picture, pixel data of the P-picture are read from the addresses YKptr to (YKptr+525311) and from the addresses CKptr to (CKptr+525311) so as to be outputted to the picture display device. Another P-picture or another I-picture, next following the B3 picture, is stored in the address YJptr to (YJptr+525311) and in addresses CJ ptr to (CJptr+525311).

After decoding of the B1 to B3 pictures has come to a close, pixel data of the B1 to B3 pictures are read out from the addresses YL1ptr to (YL1ptr+525311) and CL1ptr to (CL1ptr+525311), from the addresses YL2ptr to (YL2ptr+525311) and CL2ptr to (CL2ptr+525311) and from the addresses YL3ptr to (YL3ptr+525311) and CL3ptr to (CL3ptr+525311) so as to be outputted to the picture display device.

The site of storage of the B1 to B3 pictures are adaptively determined depending on the time from the picture used for forward prediction until itself and the time since the picture used for backward prediction until itself. That is, if the picture used for forward prediction is closer, the storage site in the data memory is determined so that the pixel that is spaced to some extent from a set of pixels of the picture used for forward prediction, copied in an address n of the data cache, and that is spaced sufficiently from a set of pixels of the picture used for backward prediction, copied in an address n of the data cache, will be copied in the address n of the data cache 13. That is, if the picture used for backward prediction is closer, the storage site in the data memory is determined so that the pixel that is spaced to some extent from a set of pixels of the picture used for backward prediction, copied in an address n of the data cache, and that is spaced sufficiently from a set of pixels of the picture used for forward prediction, copied in an address n of the data cache, will be copied in the address n of the data cache 13.

Thus, in determining the sites for storage of the B1 to B3 pictures, the ratio of the time from the picture used for forward prediction to itself to the time from the picture used for backward prediction to itself is required. This can be known from the Fcode in MPEG2. That is, the Fcode for the forward direction being smaller than the Fcode for the backward direction means that the picture used for forward prediction is closer, whereas, the Fcode for the backward direction being smaller than the Fcode for the forward direction means that the picture used for backward prediction is closer. Thus, for actual decoding for MPEG2, it can be known from the Fcode whether the current picture is B1 or B2 from the Fcode. Thus it suffices if, at a time point of decision of the current picture, the base address is set to YL1ptr or YL2ptr.

It should be noted that the present invention is not limited to the decoding, but can be adapted to a local decoding portion during the compression process. The present invention also is not limited to MPEG, which is merely an illustrative field of application of the invention.

What is claimed is:

1. An information processing method in which luminance signals and color signals stored in a data memory are copied to a data cache and pre-set processing is executed on the luminance signals and color signals copied in the data cache, comprising:

allocating sites of storage on the data memory for said luminance signals in a first location and the color signals associated with the luminance signals in a second location so that said luminance signals and the color signals associated with the luminance signals will be copied to different locations in the data cache corresponding to first and second locations;

storing the luminance signals and associated color signals thus allocated in said data memory;

reading out the luminance signals stored in the first location in said data memory and color signals associated with said luminance signals stored in the second location in said data memory and copying the said luminance signals and color signals in said different locations in said data cache; and performing pre-set processing on said luminance signals and the color signals thus copied in the different locations in said data cache.

2. The information processing method as claimed in claim 1 wherein said luminance signals and the color signals are respectively processed in terms of a 16 pixel by 16 pixel macro-block as a unit.

3. An information processing method in which first picture data and second picture data stored in a data memory are copied to a data cache and in which second picture data are processed in a pre-set manner with respect to the first picture data copied in said data cache, comprising:

allocating said first picture data and said second picture data in a first location and in a second location in said data memory so that the first picture data and second picture data associated with respective pixels will be copied to a first address and to a second address of said data cache corresponding to said first and second locations when accessing pixels of said second picture data and pixels of said first picture data referred to at a higher probability in the course of processing the pixels of said second picture data;

storing the allocated first and second picture data in said first and second locations in said data memory;

reading out the first and second picture data stored in said data memory for copying to said first address and said second address of said data cache; and performing pre-set processing on said first and second picture data thus copied in said first and second addresses.

4. The information processing method as claimed in claim 3 wherein first picture data and second picture data are allocated to said data memory so that, on accessing pixels of said second picture data and the first pixels of said first picture data referred to with a high probability in the course of the processing of the pixels of the second picture data, the first picture data spaced apart from the first pixels will be copied in the second address of the data cache.

5. An information processing method in which first picture data and second picture data stored in a data memory are copied to a data cache and in which third picture are processed in a pre-set manner with respect to the first picture data and the second picture data copied in said data cache, comprising:

storing said first picture data and the third picture data associated with respective pixels in a first location and in a third location in the data memory so that, if pixels of said first picture data are pixels referred to with a high probability, the first picture data and the third picture data associated with respective pixels will be copied to a first address and to a third address in said data cache corresponding to said first and third locations when accessing the pixels of the first picture data and the pixels of the third picture data;

storing said second picture data and the third picture data in a second location and in a third location in the data cache so that, if pixels of said first picture data are pixels referred to with a high probability, the second picture data and the third picture data associated with respective pixels will be copied to a second address and to a third address in said data cache corresponding to said second and third location when accessing the pixels of the second picture data and the pixels of third picture data;

reading out the first to third picture data stored in said data memory for copying to said first to third addresses of said data cache; and performing pre-set processing on said first to third picture data thus copied in said first to third addresses.

6. The information processing method as claimed in claim 5 wherein if the pixels of said first picture data are those referred to with a higher probability, the first picture data and the third picture data are stored in said data memory so that, on accessing the first pixels of said first picture data and the pixels of said third picture data, the first picture data of the pixels located at a position apart from said first pixel corresponding to a first distance will be copied in a third address of said data cache; and wherein if the pixels of said second picture data are those referred to with a higher probability, the second picture data and the third picture data are stored in said data memory so that, on accessing the second pixels of said second picture data and the pixels of said third picture data, the second picture data of the pixels located at a position apart from said second pixel corresponding to a second distance will be copied in said third address of said data cache.

7. The information processing method as claimed in claim 6 wherein said third picture data is predicted from said first picture data lying in the forward direction and from said second picture data lying in the backward direction.

8. The information processing method as claimed in claim 6 wherein pixels of said third picture data are stored in said data memory so that switching between a first distance between said first picture data and said third picture data and a second distance between said third picture data and said second picture data will be made depending on the ratio between said first and second distances.

9. An information processing apparatus in which luminance signals and color signals stored in a data memory are copied to a data cache and pre-set processing is executed on the luminance signals and color signals copied in the data cache, wherein
said data memory stores the luminance signals and color signals associated with said luminance signals at storage sites in the data memory allocated so that the luminance signals and the color signals associated with these luminance signals will be copied to different locations in the data cache corresponding to the storage sites; and wherein
information processing means performs pre-set processing on the luminance signals and the color signals read out from the data memory and copied in said different locations in the data cache.

10. The information processing apparatus as claimed in claim 9 wherein said data memory stores said luminance signals and the color signals in terms of 16 by 16 pixel macro-blocks as units and wherein said information processing means performs pre-set processing on the luminance signals and the color signals on the macro-block basis.

11. An information processing apparatus in which first picture data and second picture data stored in a data memory are copied in a data cache and in which second picture data are processed in a pre-set manner with respect to the first picture data copied in said data cache, wherein
said data memory allocates said first picture data and said second picture data in a first location and in a second location so that the first picture data and second picture data associated with respective pixels will be copied to a first address and to a second address of said data cache corresponding to said first and second locations when accessing first pixels of said first picture data referred to at a higher probability in the course of processing of the second pixels of said second picture data, said data memory then storing the allocated first and second picture data; and wherein
information processing means executes pre-set processing on said first picture data and the second picture data read out from said data memory and copied in said first and second addresses of said data cache.

12. The information processing apparatus as claimed in claim 11 wherein said data memory allocates the first picture data and the second picture data in the first location and in the second location so that, on accessing the pixels of the second picture data and the first pixels of the first picture data referred to with a higher probability during processing the pixels of the second picture data, the first picture data of the pixel spaced apart from the first pixel will be copied in the second address of said data cache, said data memory storing the first picture data and the second picture data thus allocated in said first and second locations.

13. An information processing apparatus in which first picture data and second picture data read out from a data memory are copied to a data cache and in which third picture data are processed in a pre-set manner with respect to the first picture data and the second picture copied in said data cache wherein
said data memory allocates said first picture data and the third picture data in a first location and in a third location so that, if pixels of said first picture data are pixels referred to with a high probability, the first picture data and the third picture data associated with respective pixels will be copied to a first address and to a third address in said data cache corresponding to said first and third location when accessing the pixels of the first picture data and the pixels of the third picture data, said data memory then storing the allocated first and third picture data;
said data memory allocates said picture data and the third picture data in a second location and in a third location so that, if pixels of said second picture data are pixels referred to with a high probability, the second picture data and the third picture data associated with respective pixels will be copied to a second addresses and to a third addresses in said data cache corresponding to said second and third location when accessing the pixels of the first picture data and the pixels of the third picture data, and stores the allocated first and third picture data; and wherein
information processing means executes pre-set processing on said first to third picture data read out from said data memory and copied in said first to third addresses of said data cache.

14. The information processing apparatus as claimed in claim 13 wherein
if the pixels of said first picture data are those referred to with a higher probability, the first picture data and the third picture data are allocated and stored in said first location and in said second location so that, on accessing the pixels of said first picture data and the pixels of said third picture data, the first picture data of the pixels located at a position apart from said first pixel corresponding to a first distance will be copied in a third address of said data cache; and wherein
if the pixels of said second picture data are those referred to with a higher probability, the second picture data and the third picture data are allocated and stored in said second location and said third location so that, on accessing the pixels of said second picture data of the pixels located at a position apart from said second pixel corresponding to a second distance will be copied in said third address of said data cache.

15. The information processing apparatus as claimed in claim 14 wherein said data memory stores third picture data that is predicted from said first picture data lying in the forward direction and from said second picture data lying in the backward direction.

16. The information processing apparatus as claimed in claim 14 wherein pixels of said third picture data are stored in said data memory so that switching between a first distance between said first picture data and said third picture data and a second distance between said third picture data and said second picture data will be made depending on the ration between said first and second distances.

17. A programmable storage device readable by a machine, tangibly embodying a program of instructions executable by the machine to perform method steps for processing luminance signals and chroma signals associated with said luminance signals, said method steps comprising:
allocating sites of storage on the data memory for said luminance signals in a first location and the color signals associated with the luminance signals in a second location so that said luminance signals and the color signals will be copied to different locations in the data cache corresponding to said fist and second locations;

storing the luminance signals and color signals thus allocated in said data memory;

reading out the luminance signals stored in the first location in said data memory and the color signals associated with said luminance signals stored in the second location in said data memory and copying the luminance signals and color signals in said different locations in said data cache; and performing pre-set processing on said luminance signals and the color signals thus copied in the different locations in said data cache.

18. The program storage device as claimed in claim 17 wherein said luminance signals and the color signals are respectively processed in terms of a 16 pixel by 16 pixel macro-block as a unit.

19. A programmable storage device readable by a machine, tangibly embodying a program of instructions executable by the machine to perform method steps for processing first picture data and second picture data associated with said first picture data, said method steps comprising:

allocating first picture data and second picture data in a first location and in a second location in said data memory so that said first picture data and said second picture data associated with respective pixels will be copied to a first address and to a second address of said data cache corresponding to said first and second location when accessing pixels of said second picture data and pixels of said first pixel data referred to at a higher probability in the course of processing the pixels of said second picture data;

storing the allocated first and second picture data;

reading out the first and second picture data stored in said data memory for copying to said first address and to second address of said data cache; and performing pre-set processing on said first and second picture data thus copied in said first and second addresses.

20. The programmable storage device as claimed in claim 19 wherein first picture data and second picture data are allocated to said data memory so that, on accessing pixels of said second picture data and the first pixels of said first picture referred to with a high probability in the course of the processing of the pixels of the second picture data, the first picture data spaced apart from the first pixels will be copied in the second address of the data cache.

21. A program storage device readable by a machine, tangibly embodying a program of instructions by the machine to perform method steps for processing a third picture data by referring to first and second picture data, said method steps comprising:

storing said first picture data and a third picture data associated with respective pixels in a first location and in a third location in the data memory so that, if pixels of said first picture data are pixels referred to with a high probability, the first picture data and the third picture data associated with respective pixels will be copied to a first address and to a third address in said data cache corresponding to said first and third location when accessing the pixels of the first picture data and the pixels of the third picture data;

storing said second picture data and the third picture data in a second location and in a third location in the data cache so that, if pixels of said second picture data are pixels referred to with a high probability, the second picture data and the third picture data associated with respective pixels will be copied to a second address and to a third address in said data cache corresponding to said second and third locations when accessing the pixels of the second picture data and the pixels of the third picture data;

reading out the first to third picture data stored in said data memory;

copying the first to third picture data thus read out to said first to third addresses of said data cache; and performing pre-set processing on said first to third picture data thus copied in said first to third addresses.

22. The program storage device as claimed in claim 21 wherein if the pixels of said first picture data are those referred to with a higher probability, the first picture data and the third picture data are stored in said data memory so that, on accessing the first pixels of said first picture data and the pixels of said third picture data, the first picture data of the pixels located at a position apart from said first pixel corresponding to a first distance will be copied in a third address of said data cache; and wherein if the pixels of said second picture data are those referred to with a higher probability, the second picture data and the third picture data are stored in said data memory so that, on accessing the second pixels of said second picture data and the pixels of said third picture data, the second picture data of the pixels located at a position apart from said second pixel corresponding to a second distance will be copied in said third address of said data cache.

23. The program storage device as claimed in claim 22 wherein said third picture data is predicted from said first picture data lying in the forward direction and from said second picture data lying in the backward direction.

24. The program storage device as claimed in claim 22 wherein pixels of said third picture data are stored in said data memory so that switching between a first distance between said first picture data and said third picture data and a second distance between said third picture data and said second picture data will be made depending on the ration between said first and second distances.

* * * * *